(12) United States Patent
Brombal et al.

(10) Patent No.: US 8,964,698 B2
(45) Date of Patent: Feb. 24, 2015

(54) LINK FAILURE DETECTION AND INTERWORKING SYSTEM RELOCATION IN CIRCUIT SWITCHED FALLBACK

(75) Inventors: David Brombal, Plano, TX (US); Chi Lo, Plano, TX (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 304 days.

(21) Appl. No.: 13/549,632

(22) Filed: Jul. 16, 2012

(65) Prior Publication Data

US 2013/0265884 A1    Oct. 10, 2013

Related U.S. Application Data

(60) Provisional application No. 61/621,614, filed on Apr. 9, 2012.

(51) Int. Cl.
*H04W 36/00* (2009.01)
*H04W 4/00* (2009.01)

(52) U.S. Cl.
USPC .......................................... 370/331; 455/436

(58) Field of Classification Search
None
See application file for complete search history.

(56) References Cited

U.S. PATENT DOCUMENTS

| | | | |
|---|---|---|---|
| 2011/0176413 A1 | 7/2011 | Tanabe et al. | |
| 2011/0280217 A1 | 11/2011 | Drevon et al. | |
| 2012/0063300 A1 | 3/2012 | Sahin et al. | |
| 2012/0120789 A1* | 5/2012 | Ramachandran et al. | 370/220 |
| 2012/0188868 A1* | 7/2012 | Saavedra | 370/221 |
| 2013/0051246 A1* | 2/2013 | Beshai et al. | 370/242 |

* cited by examiner

*Primary Examiner* — Habte Mered

(57) ABSTRACT

A method and mechanism to detect failure of an S102 link between an Evolved Packet Core, EPC, network based Mobility Management Entity, MME, and an Interworking System, IWS, in a Mobile Switching Center, MSC, pool deploying Circuit Switched Fallback, CSFB, for the EPC network. A heartbeat message exchange between an MME-IWS pair augments the current standards to provide a simple and direct method to monitor the application layer status of the S102 link between the EPC-based MME and the MSC pool-based IWS. Upon detecting a link failure, message flows can be quickly re-routed to another S102 link or MSC. Reverse use of an A21 Event Notification message from an IWS to MME, or a re-assigned IWS's delayed acknowledgement of an initial call-related message from an MME also augment the current standards to address IWS relocation related message-bouncing in MSC pool-based deployments of CSFB, thereby allowing efficient routing of messages.

25 Claims, 11 Drawing Sheets

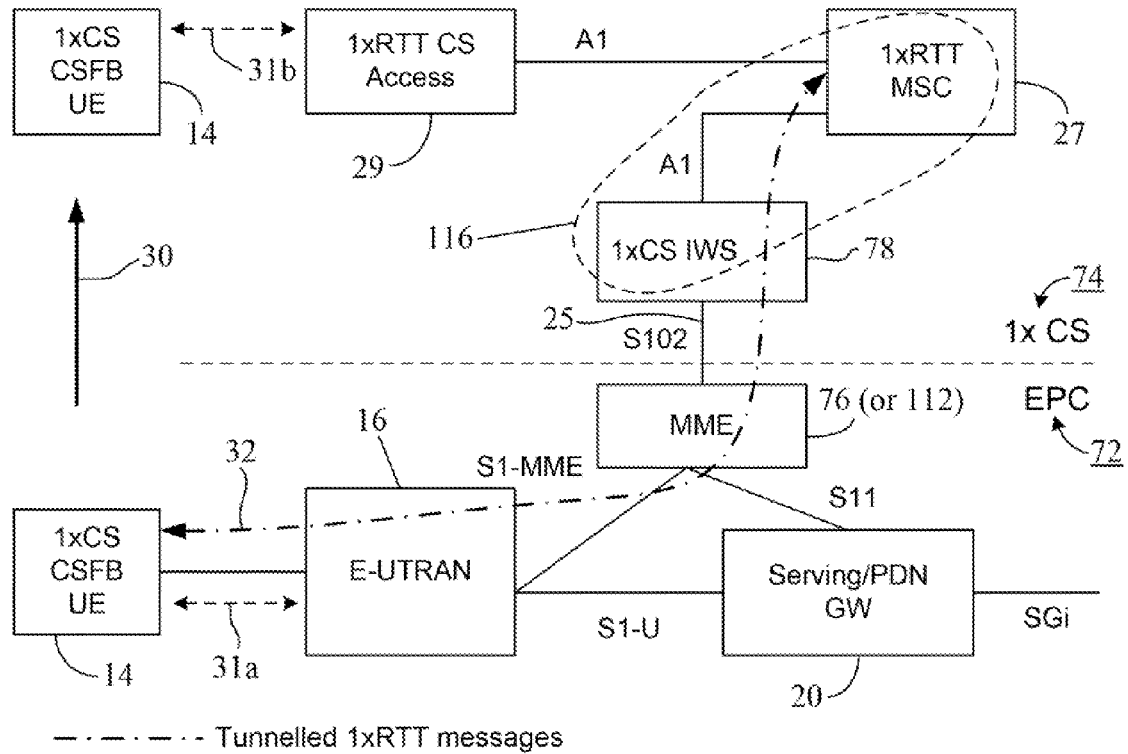
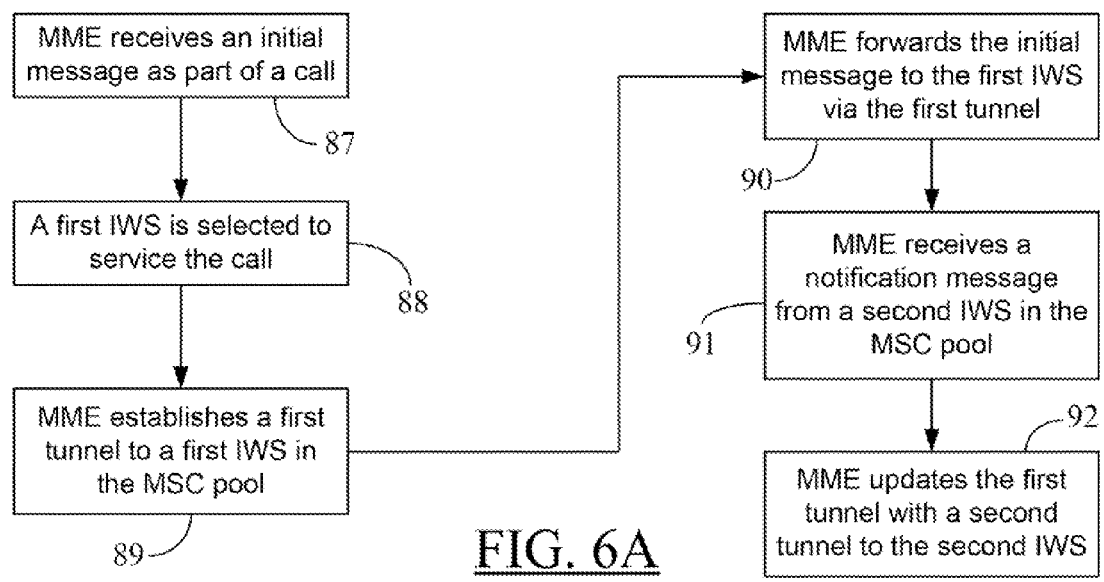
FIG. 4
FIG. 6A

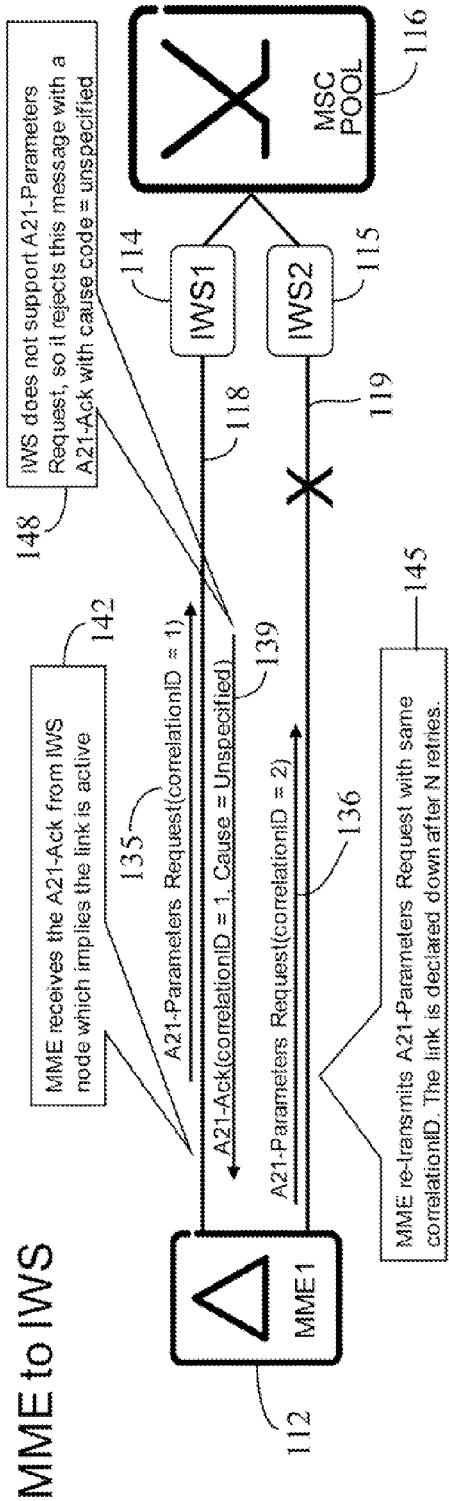
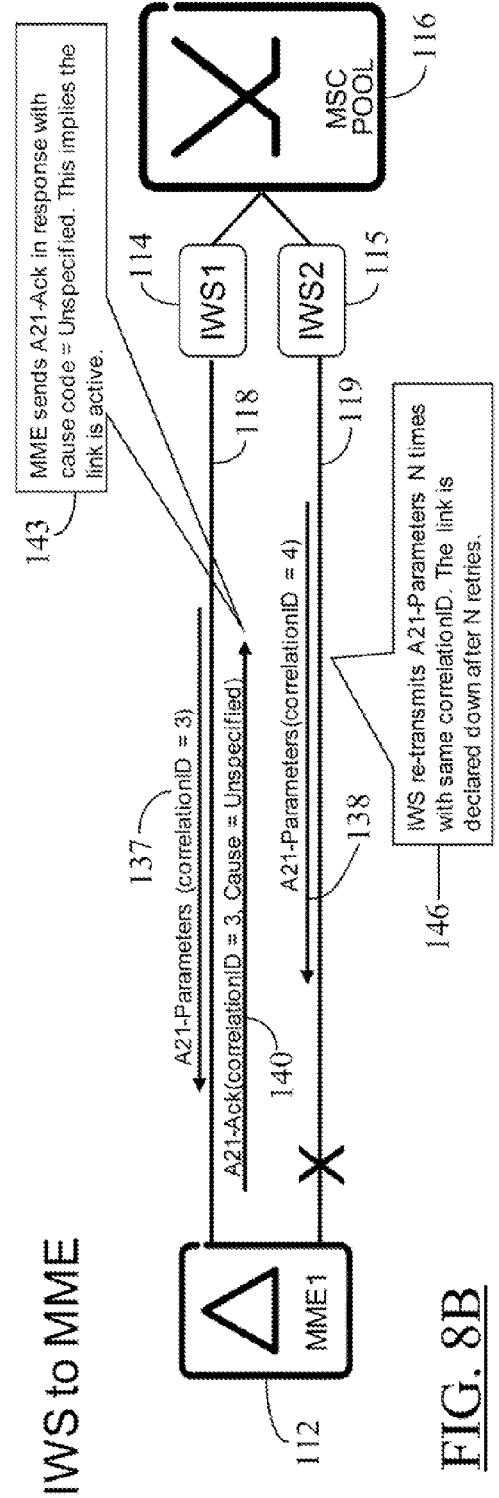

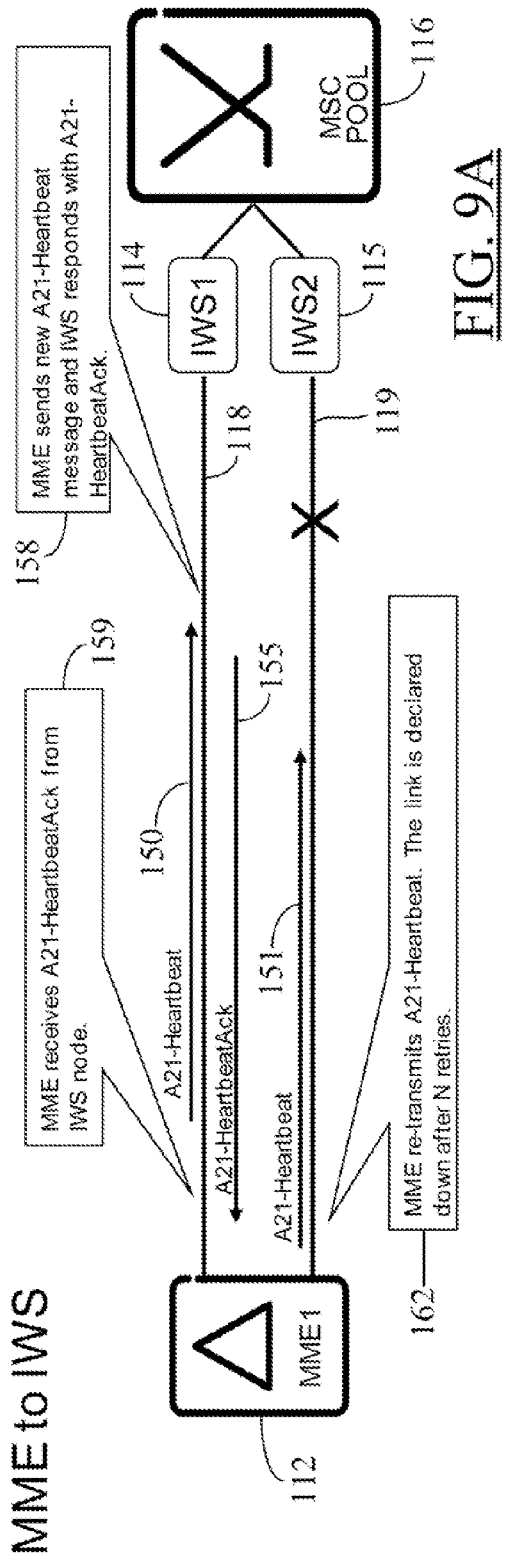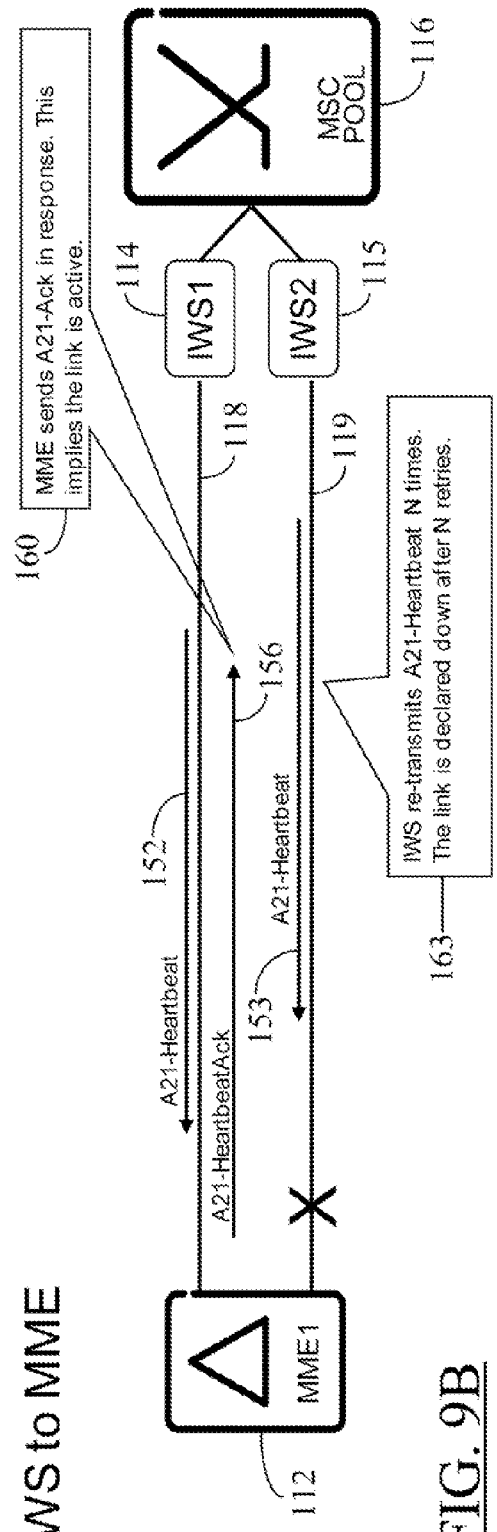

LINK FAILURE DETECTION AND INTERWORKING SYSTEM RELOCATION IN CIRCUIT SWITCHED FALLBACK

CROSS-REFERENCE TO RELATED APPLICATIONS

This application claims the priority benefit under 35 U.S.C. §119(e) of U.S. Provisional Application No. 61/621,614 filed on Apr. 9, 2012, the disclosure of which is incorporated herein by reference in its entirety.

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

TECHNICAL FIELD

The present invention relates to wireless communication that uses Circuit Switched (CS) infrastructure. More particularly, and not by way of limitation, particular embodiments of the present invention are directed to a system and method that improves robustness and efficiency of messaging between an Evolved Packet Core (EPC) network and a CS network in a pooled Mobile Switching Center (MSC) environment.

BACKGROUND

With ever-increasing demand for wireless communication and broadband services, there is an ongoing evolution of Third Generation (3G) and Fourth Generation (4G) cellular networks like High Speed Packet Access (HSPA), Evolution-Data Optimized (EV-DO), Long Term Evolution (LTE), Worldwide Interoperability for Microwave Access (WiMAX), International Mobile Telecommunications-Advanced (IMT-Advanced) (e.g., LTE Advanced), etc., to support ever-increasing performance with regard to capacity, peak bit rates and coverage. In case of a mobile communication environment, such as Third Generation Partnership Project's (3GPP) LTE network, the Evolved Universal Terrestrial Radio Access (EUTRA) or Evolved Universal Terrestrial Radio Access Network (E-UTRAN) air interface for LTE may support wireless broadband data service at a rate of up to 300 Mbps in the downlink (DL) and 75 Mbps in the uplink (UL).

One of the design targets of an LTE system is cost optimization, wherein complexity is reduced by focusing on only Internet Protocol (IP) capability—i.e., using data packets for all communication (whether voice call, text message, multimedia messages, etc.). In this packet-switched approach of LTE, a Circuit-Switched (CS) domain may not be supported when a Mobile Station (MS) or User Equipment (UE) is connected for LTE radio access. In that event, an IP Multimedia Subsystem (IMS) core may be needed (for packet data transmission over CS domain, and vice versa) even if the LTE UE is making a simple voice call. However, in early deployments of LTE, full LTE radio coverage may not be available across an operator's entire network or the operator may not have yet deployed an IMS core to support voice services over LTE. Thus, an LTE deployment may initially lack support for traditional mobile phone services like voice call, text message, multimedia messages vis-à-vis various other systems implemented on CS domain. Thus, to enable LTE to handle traditional phone services so as to be able to eventually replace current Second Generation (2G) and 3G networks, Circuit Switched Fallback (CSFB) was proposed to hand over voice calls from LTE to circuit-switched 2G/3G domains. The CSFB enables the delivery of CS-domain services by reuse of the CS infrastructure when a Mobile Station (MS) or User Equipment (UE) is normally served by another access technology, such as LTE.

It is known that a CS network is a type of network in which a physical path is obtained for and dedicated to a single connection between two end points in the network for the duration of the connection. A virtual CS connection (which may be used in a packet-switched network like LTE) is a dedicated logical connection that allows sharing of the physical path among multiple virtual circuit connections for packetized data transfer.

The CSFB approach allows network operators to guarantee voice service when a subscriber is connected to an LTE network. CSFB essentially kicks the phone off of LTE when traditional phone services are being used, and then flips the phone back to LTE when the voice call is over. Thus, voice calls by all-data LTE networks may be supported using CSFB to CS domains supported by other 2G/3G systems such as Wideband Code Division Multiple Access (WCDMA) systems, CDMA2000 systems, Global System for Mobile Communications (GSM) networks, etc., which support both voice and data at once anyway.

FIG. 1 illustrates an existing architecture 10 to enable CSFB from LTE-based E-UTRAN access to CDMA Single Carrier (1x) Radio Transmission Technology (RTT) CS domain access. The architecture 10 in FIG. 1 is discussed in more detail in 3GPP Technical Specification (TS) 23.272 v10.5.0 (titled "Circuit Switched (CS) fallback in Evolved Packet System (EPS); Stage 2") and, hence, only a brief overview of the architecture that is relevant to the present disclosure is provided herein. The architecture 10 in FIG. 1 supports voice and other CS-domain services by reuse of the 1xCS infrastructure 12 (where various network elements may have circuit-switched connections therebetween) when a UE 14 is served by E-UTRAN 16 (in an LTE cell (not shown) in an EPC network domain 18). It is assumed here that the user terminal (MS or UE) 14 may be a dual-mode terminal capable of supporting E-UTRAN access as well as CSFB to 1xCS domain 12. Many details such as base stations or Evolved Node B's (eNB or eNodeB), network cells, etc., are not shown in FIG. 1 for the sake of simplicity and because of their lack of relevance to the present disclosure. In FIG. 1, the E-UTRAN 16 in the EPC domain 18 is shown connected to a gateway 20 via an S1-U interface (also referred to as "reference point" in relevant literature) to support packet data transfer and mobility of the UE 14 within the EPC network domain 18. The gateway 20 may be a Serving Gateway (S-GW) and/or Packet Data Network (PDN) Gateway (P-GW), which may be connected to an external IP network (e.g., the Internet) (not shown) via an SGi interface to provide the UE 14 in the LTE cell with seamless (and wireless) access to many different resources or systems beyond those operating within the operator's core network 18. A Mobility Management Entity (MME) 22 in the EPC network 18 may be configured to interface with an Interworking System (IWS) 24 in the 1xCS domain 12 via an S102 link or tunnel 25 to support CSFB to 1xRTT as discussed in more detail below. In other words, the CS fallback to 1xRTT is realized by using the S102 reference point 25 between the EPC network-based MME 22 and CS domain-based 1xCS IWS 24. The LTE radio access network (i.e., E-UTRAN 16 in FIG. 1) may connect to the MME 22 via an S1-MME reference point, whereas the gateway 20 may connect to the MME 22 via an S11 reference point as shown in FIG. 1.

The IWS 24 may be associated with a switch or 1xRTT Mobile Switching Center 27 via an A1 interface. It is observed here that an IWS may be logically co-located at a 1x Base Station Controller (BSC), co-located at the MSC 27, or may be a stand-alone entity (as shown, for example, in FIGS. 1-2). The reference numeral "29" in FIG. 1 may represent not only the BSC, but the Base Station (BS) as well. Hence, block 29 in FIG. 1 is generally labeled as "1xRTT CS Access." If co-located, the IWS 24 may be with the BSC portion of the block 29 as stated earlier. In one embodiment, an IWS may be implemented as a function that supports CSFB solution for E-UTRAN to 1xCS fallback. The IWS may select a 1x BS that will serve the MS/UE for circuit-switched services. An IWS may provide functions such as, for example, translation between messages sent to or received from its associated MSC over the A1 interface and 1x air interface signaling messages received from or sent to tunneled air interfaces (e.g., E-UTRAN). As mentioned before, a 1x IWS may be linked to an EPC network-based entity (i.e., an MME) via an S102 reference point.

The MSC 27 may offer switching functionality to connect UE-originated calls to other public networks (e.g., Public Switched Telephone Network (PSTN), Integrated Services Digital Network (ISDN), etc.) (not shown), other MSCs in the same network, or MSCs in different networks. The MSC 27 thus provides a CS interface for user traffic between the wireless network and other public switched networks or other MSCs. Although the discussion herein is primarily in the context of a circuit-switched MSC, it is understood that the MSC functionality may be divided so that the call control or mobility management and routing function may be implemented using a Mobile Switching Center emulation (MSCe), which may provide packet-based processing and control via IP based protocols. Thus, the MSC 27 may include such MSCe functionality as well.

In CSFB operation, initial mobile origination or paging (i.e., mobile termination) signaling may be sent between the user's terminal (i.e., the UE 14) and the legacy CS network (here, the 1xCS network 12) via a tunnel established from the LTE cell (or more correctly, from the EPC network 18) to an IWS in the legacy network (here, the IWS 24 in FIG. 1). In the configuration of FIG. 1, the S102 link 25 supports such tunnel, which is used to establish the initial call parameters. The UE 14 is then instructed (e.g., via the MME 22 and EUTRAN 16 in the EPC network 18) to fall back to the circuit-switched legacy network (as symbolically illustrated by arrow 30 in FIG. 1) to complete the connection of the bearer resources through the 1xRTT Access 29 and carry on the voice conversation. (In FIG. 1, dotted lines 31a and 31b symbolically illustrate wireless connections that exist between the UE 14 and the respective wireless base stations during CSFB.) At the end of the voice call, the UE 14 drops the CS connection and reconnects to the LTE network. In FIG. 1, the dotted arrow 32 illustrates the path of 1xRTT messages that are tunneled (via the S102 link 25) from the UE 14 (operating in the EPC network 18) to the MSC 27 (in the 1xCS network 12) during the time the UE 14 remains connected in the EPC network 18.

SUMMARY

The 1x CSFB solution discussed above with reference to FIG. 1 is prescribed in many standards-based technical references such as, for example, the earlier-mentioned 3GPP TS 23.272, as well as 3GPP TS 29.277 v10.0.0 (titled "Optimized Handover Procedures and Protocol between EUTRAN access and non-3GPP accesses (S102), Stage 3"), Third Generation Partnership Project 2's (3GPP2) Technical Specification Group (TSG) document A.S0008-C v4.0 (titled "Interoperability Specifications (IOS) for High Rate Packet Data (HRPD) Radio Access Network Interfaces with Session Control in the Access Network"), 3GPP2 TSG document C.S0097 v2.0 (titled "cdma2000 1x Connectivity and Interworking Air Interface Specification (GCSNA)"), 3GPP2 TSG document C.S0005-E (titled "Upper Layer (Layer 3) Signalling Specification for cdma2000 Spread Spectrum Systems"), and 3GPP2 TSG document A.S0009-C (titled "Interoperability Specifications (IOS) for High Rate Packet Data (HRPD) Radio Access Network Interfaces with Session Control in the Packet Control Function").

The CSFB solution prescribed by the standards requires that the EPC network (e.g., the EPC network 18 in FIG. 1) at least initially select a specific legacy IWS (e.g., the IWS 24 in FIG. 1) based on the LTE cell the user is calling from. Each LTE cell is associated with a specific legacy cell (e.g. a WCDMA cell or a cdma200 cell) based on their geographic overlap. That is, the LTE cell is configured with a legacy cell that is a geographic "best match," and that determines the switch (e.g., the MSC 27 in FIG. 1)—and thereby the associated IWS (here the IWS 24)—that services that "equivalent" legacy cell. In this manner the EPC network 18 initially "selects" a legacy IWS to service an initial message received from the UE 14 as part of the voice call initiated by the user.

However, when the legacy network uses a pool of switches (as shown in FIG. 2 discussed below) to serve a set of LTE cells (referred to as "MSC pooling"), there is no longer a one-to-one association between an LTE cell and a serving MSC. FIG. 2 illustrates an exemplary MSC pooling configuration 35 having two MSC pools 36-37, each of which serves an LTE cell. As shown, MSC pool 36 serves LTE cell-1 40 and MSC pool 37 serves LTE cell-2 41. It is understood here that the configuration 35 is exemplary only; in an actual implementation, there may be many more such LTE cells and MSC pools than those shown in FIG. 2. A 1xCSFB capable UE 43 (similar to the UE 14 in FIG. 1) is shown operating in the LTE cell 40. It is understood that each of the cells 40-41 may have many more such UEs (not shown for the sake of simplicity) operating within the cell. The cells 40-41 may be part of an EPC network (similar to the EPC network 18 in FIG. 1) that includes cell-specific base stations or eNodeB's 45-46 and MME's 48-49 as shown in FIG. 2. Each MSC pool 36, 37 may include one or more switches or MSCs—for example, the MSC pool 36 is shown to include two switches 50-51, whereas the MSC pool 37 includes a single MSC 52. There may be one or more IWS's associated with each switch in the MSC pool. However, for the sake of simplicity and clarity, only one IWS 54-56 is shown associated with each corresponding switch 50-52 in FIG. 2. As in case of a single MME-IWS pair in FIG. 1, each MME 48, 49 in FIG. 2 is linked with each IWS via a corresponding S102 link/tunnel 58A through 58F. Thus, in case of the pooled configuration 35, the EPC network now has several S102 links 58A-58F (representing different IWS's in the 1xCS domain) that can, and should, be used to service the traffic from a set of LTE cells 40-41.

FIG. 3 shows general details of an exemplary S102 link 60 (e.g., link 25 in FIG. 1 with a detail view of the protocol layers and links 58A-58F in FIG. 2) between an MME (like the MME 49 in FIG. 2) and an MSC pool 64 (e.g., the MSC pool 37 in FIG. 2). As mentioned before, the S102 link 60 is the reference point between the MME 62 and a 1x IWS (not shown) in the MSC pool 64. The S102 reference point provides a tunnel between MME and 1xCS IWS to relay 1xCS signaling messages. 1xCS signaling messages are those messages that are defined for A21 interface as described, for example, in the earlier-mentioned 3GPP2 TSG documents A.S0008-C and A.S0009-C. The A21 interface (discussed later hereinbelow) carries signaling information between two endpoints of the S102 link—i.e., between an EPC network-based MME and an MSC pool-based IWS in the context of the present disclosure. It is observed from the earlier-mentioned 3GPP TS 29.277 that the S102 application is based on User Datagram Protocol (UDP)/IP transport media to allow CS fallback to 1xRTT for establishment of voice calls in the CS domain. Delivery of voice-terminated calls via an S102 link may be accomplished using procedures specified in earlier-mentioned 3GPP TS 23.272.

The purpose of MSC pooling is to maximize network robustness. Therefore, the failure of IWS-specific S102 links or an entire MSC (which may be associated with more than one IWS as mentioned earlier) should be detected, and traffic re-routed. However, in the above-mentioned 3GPP and 3GPP2 standards, the S102 link to an IWS is based on UDP, which has no built-in reliability. As is known, UDP is a transport protocol providing a direct way to send and receive datagrams (or user data packets) over an IP network, but with few error recovery resources. UDP may be used mainly for broadcasting over a network, for example, with streaming media. Thus, UDP provides simple but unreliable datagram services. In other words, a UDP-based architecture has no inherent ability to detect link failures in a pooled MSC environment. Typically, each 1xIWS function is represented and viewed by the MME as one entity with one IP address. Thus, in case of multiple 1xIWS per MSC pool, potentially multiple IP addresses per 1xIWS may be present to achieve the desired redundancy/reliability in the MSC pool. However, the UDP-based S102 architecture of existing standards inherently lacks the ability to detect S102 link failures when each MSC can potentially have multiple 1xIWSs, each with a different IP address. Although the S102 standard includes an ACK message to allow for detecting/retransmitting of lost messages, loss of a message in a UDP environment does not indicate an S102 link failure. These ACK's are per user per message and do not provide a direct indication of link failure; loss of messages for a given user does not mean messages for other users are also being lost.

Because the standards do not provide any "keep-alive" messages or other mechanism to detect S102 link failures in the context of its UDP-based implementation, such deficiency in the standards removes the benefit of a pooled MSC network (having multiple S102 links serving multiple LTE cells) when used by a CSFB solution.

Furthermore, a second problem exists when CSFB is deployed in a pooled MSC environment. In the EPC network, once an IWS is selected to service the initial message from a user (e.g., the registration message for the 1xCS legacy network), subsequent messages from that user will be sent to the same IWS. This is done on the (legitimate) expectation that using another IWS will require the pooled switches to bounce the message within the pool to the switch (associated with the originally-selected IWS) that holds the registration and profile information for the user. This bouncing would be inefficient, consuming time and resources that could be saved by sending the message to the correct (i.e., originally-selected) IWS each time.

However, in a pooled environment, load-balancing actions within an MSC pool can result in the selection of a serving switch (or MSC) that is different from the one the EPC network or MME initially selected (via its initial selection of the corresponding IWS) for message delivery. Such load-balancing may decide which MSC is best able to handle the current transaction. This means that continuing to use the initially-selected IWS is in fact causing the very problem that reusing the initial IWS was intended to avoid. In other words, if an MME in the EPC network continues to send user messages to the initially-selected IWS, these messages would end up bouncing within the MSC pool until delivered to the serving MSC because the MSC associated with the initially-selected IWS is no longer the serving MSC as a result of load-balancing within the MSC pool.

From the discussion above, it is seen that benefits of MSC pooling are dwarfed by two defects in the existing standards addressing CSFB in a pooled MSC environment: (i) lack of any standard-based mechanism to detect S102 link failures, and (ii) lack of any standard-based mechanism to update the EPC network when IWS relocation (or re-assignment) occurs due to load-balancing with the MSC pool—i.e., when the serving IWS (associated with the serving MSC) is different from the originally-selected IWS.

It is therefore desirable to address the link failure and the IWS relocation problems when CSFB is deployed in a pooled MSC environment. It is further desirable to address these problems without significant impact on existing network hardware or deployments.

Particular embodiments of the present disclosure provide solutions to the above-mentioned problems of link failure detection and notification of IWS re-assignment. These solutions may be introduced into the relevant 3GPP and/or 3GPP2 standards so as to extend the standards and allow the problems to be solved for existing and future CSFB arrangements. A method of "keep alive" messages (referred to herein as a "heartbeat" or "echo" mechanism) is recommended to detect link failures, thereby providing a timely decision to route messages to an alternate MSC. Either end point (i.e., MME or IWS) of an S102 link may send a heartbeat message to the other end point, and the other end must send an acknowledgment ("Ack"). A timer is used to decide when an Ack has not been received in a timely manner and is considered lost. After the loss of a configurable number of messages, the corresponding S102 link is marked as "down" and alternate links may be used to re-route the user (UE) messages until the "down" link again successfully passes the heartbeat/echo "test."

In case of IWS relocation/re-assignment, it is usually best and efficient if the MME can forward all subsequent messages from a user to an IWS associated with the MSC selected after load-balancing (i.e., the serving MSC). Hence, in particular embodiments of the present disclosure, a notification message is sent from the IWS associated with the serving MSC to update the EPC network (and MME) of IWS relocation resulting from load-balancing with the MSC pool. This allows the MME to tunnel subsequent user messages directly to the new IWS instead of the originally-selected IWS, thereby preventing the internal bouncing of messages within the MSC pool. Such notification message may be considered an "IWS redirection" message, which may be analogous to the existing "S102 Redirection" Event Notification message used to indicate reassignment of the MME.

In certain other embodiments, the acknowledgement for the initially-received message (e.g., the registration message for the 1xCS network) may be delayed until the serving MSC is identified and has been delivered the initial message. Thereafter, the acknowledgement is sent to the MME via the IWS associated with this (new) serving MSC, and not via the originally-selected IWS that first received the initial message from the MME. This allows the MME to tunnel subsequent user messages directly to the new IWS instead of the originally-selected IWS.

In one embodiment, the present disclosure is directed to a method of detecting failure of a link having a first end point and a second end point, wherein the link connects an Evolved Packet Core (EPC) based network and a Mobile Switching Center (MSC) pool deploying Circuit Switched Fallback (CSFB) for the EPC-based network. The method comprises the following steps: (i) the first end point sending at least one first message to the second end point; (ii) the first end point waiting for a predetermined time to receive a second message from the second end point, wherein the second message represents acknowledgment of receipt of the first message by the second end point; and (iii) the first end point detecting that the link has failed upon non-receipt of the second message at the conclusion of the predetermined wait time.

In another embodiment, the present disclosure is directed to an EPC network coupled to an MSC pool deploying CSFB for the EPC network, wherein a link connects an MME in the EPC network with an IWS in the MSC pool. The MME and the IWS form end points of the link. The EPC network is configured to perform the following: (i) send at least one first message from the MME to the IWS; (ii) wait for a predetermined time to receive a second message from the IWS to the MME, wherein the second message represents acknowledgment of receipt of the first message by the IWS; and (iii) detect that the link has failed when the MME fails to receive the second message from the IWS at the conclusion of the predetermined wait time. Alternatively, the IWS may periodically transmit messages to the MME, and the MME detects that the link has failed when the MME fails to receive a configurable number of successive messages from the IWS.

In yet another embodiment, the present disclosure is directed to an MSC pool coupled to an EPC network and deploying CSFB for the EPC network, wherein a link connects an IWS in the MSC pool with an MME in the EPC network. The IWS and the MME form end points of the link. The MSC pool is configured to perform the following: (i) send at least one first message from the IWS to the MME; (ii) wait for a predetermined time to receive a second message from the MME to the IWS, wherein the second message represents acknowledgment of receipt of the first message by the MME; and (iii) detect that the link has failed when the IWS fails to receive the second message from the MME at the conclusion of the predetermined wait time. Alternatively, the MME may periodically transmit messages to the IWS, and the MSC pool detects that the link has failed when the IWS fails to receive a configurable number of successive messages from the MME.

In one embodiment, the present disclosure is directed to a method of updating an MME in an EPC network with information about re-assignment of IWS's within an MSC pool that deploys CSFB for the EPC network. The method comprises the steps of: (i) the MME receiving an initial message as part of a call from a mobile communication unit operating in the EPC network; (ii) the MME establishing a first tunnel to a first IWS in the MSC pool selected by the EPC network to service the initial message received from the mobile communication unit, wherein the first tunnel maps a first identification of the mobile communication unit to a second identification of the first IWS; (iii) the MME forwarding the initial message to the first IWS using the first tunnel; (iv) the MME receiving a notification message from a second IWS in the MSC pool, wherein the second IWS is assigned by the MSC pool to service the call from the mobile communication unit instead of the EPC network-selected first IWS; and (iv) in response to receiving the notification message, the MME updating the first tunnel with a second tunnel to the second IWS, wherein the second tunnel replaces the mapping in the first tunnel with a mapping from the first identification of the mobile communication unit to a third identification of the second IWS.

In a still further embodiment, the present invention is directed to an MSC pool coupled to an EPC network and deploying CSFB for the EPC network. The MSC pool is configured to perform the following: (i) receive an initial message at a first IWS in the MSC pool from an MME in the EPC network, wherein the initial message is received at the first IWS (associated with a first MSC in the MSC pool) via a first tunnel and is part of a call received at the MME from a mobile communication unit operating in the EPC network; (ii) assign a second IWS (associated with a second MSC in the MSC pool) instead of the first IWS to service the call from the mobile communication unit; and (iii) send a notification message from the second IWS to the MME using a second tunnel that is different from the first tunnel, wherein the notification message contains an Internet Protocol (IP) address of the second IWS, thereby allowing the MME to send all subsequent call-related messages from the mobile communication unit to the second IWS only via the second tunnel and without involving the first IWS.

In yet another embodiment, the present disclosure is directed to a method of updating an MME in an EPC network with information about re-assignment of IWS's within an MSC pool that deploys CSFB for the EPC network. The method comprises the steps of: (i) the MME receiving a call from a mobile communication unit operating in the EPC network; (ii) the MME establishing a first tunnel to a first IWS in the MSC pool selected by the EPC network to service an initial message received from the mobile communication unit as part of the call therefrom, wherein the first tunnel maps an identification of the mobile communication unit to an identification of the first IWS; (iii) the MME forwarding the initial message to the first IWS using the first tunnel; (iv) the MME receiving an acknowledgement message corresponding to the MME-sent initial message; (v) the MME checking a source address of the acknowledgement message to determine whether the acknowledgement message is from the first IWS or a second IWS in the MSC pool that is different from the first IWS, wherein the second IWS is assigned by the MSC pool to service the call from the mobile communication unit instead of the EPC network-selected first IWS, and wherein the acknowledgement message contains the identification of the first IWS as the source address thereof when the first IWS services the call or an identification of the second IWS as the source address thereof when the second IWS is assigned to service the call; and (vi) upon determining that the acknowledgement message is from the second IWS, the MME updating the first tunnel with a second tunnel to the second IWS, wherein the second tunnel replaces the mapping in the first tunnel with a mapping from the identification of the mobile communication unit to the identification of the second IWS.

Particular embodiments of the present disclosure thus provide solutions to S102 link failure and IWS relocation problems in the current MSC pool-based deployments of CSFB. These solutions may be implemented without any significant impact on existing network hardware or deployments. The link heartbeat message exchange augments the current standards to provide a simple and direct method to monitor the application layer status of the S102 link between the EPC-based MME and the MSC pool-based IWS. Upon detecting a link failure, message flows can be quickly re-routed to another link or MSC, thus improving system throughput and robustness. Similarly, the IWS relocation message exchange also augments the current standards to provide a method for allowing efficient routing of messages within a pooled MSC environment. One embodiment uses a technique analogous to the messaging model already defined to indicate relocation of an MME.

BRIEF DESCRIPTION OF THE DRAWINGS

In the following section, the invention will be described with reference to exemplary embodiments illustrated in the figures, in which:

FIG. 4 is an exemplary CSFB architecture that addresses link failure detection and IWS relocation aspects according to particular embodiments of the present disclosure;

FIGS. 6A-6C provide exemplary flowcharts according to particular embodiments of the present disclosure showing how an MME in an EPC network may be updated with information about relocation (or re-assignment) of IWS's within an MSC pool that deploys CSFB for the EPC network;

FIGS. 8A-8B illustrate exemplary messages that may be used to implement a heartbeat mechanism according to one embodiment of the present disclosure;

FIGS. 9A-9B depict additional exemplary messages that may be used to implement a heartbeat mechanism according to one embodiment of the present disclosure;

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components, and circuits have not been described in detail so as not to obscure the present invention. Additionally, it should be understood that although the invention is described primarily in the context of an LTE cellular telephone/data network, the invention can be implemented in other forms of cellular wireless networks as well (e.g., WCDMA and the like).

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Also, depending on the context of discussion herein, a singular term may include its plural forms and a plural term may include its singular form. Similarly, a hyphenated term (e.g., "pre-determined," "EPC-based," etc.) may be occasionally interchangeably used with its non-hyphenated version (e.g., "predetermined," "EPC based," etc.), a capitalized entry (e.g., "CDMA2000") may be interchangeably used with its non-capitalized version (e.g., "cdma2000"), and plural terms may be indicated with or without an apostrophe (e.g., UE's or UEs, IWS's or IWSs). Such occasional interchangeable uses shall not be considered inconsistent with each other.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing voice information or non-voice data/control information) to/from the second entity regardless of the type (analog or digital) of those signals. It is further noted that various figures (including component diagrams) shown and discussed herein are for illustrative purpose only, and are not drawn to scale.

Figure 1:
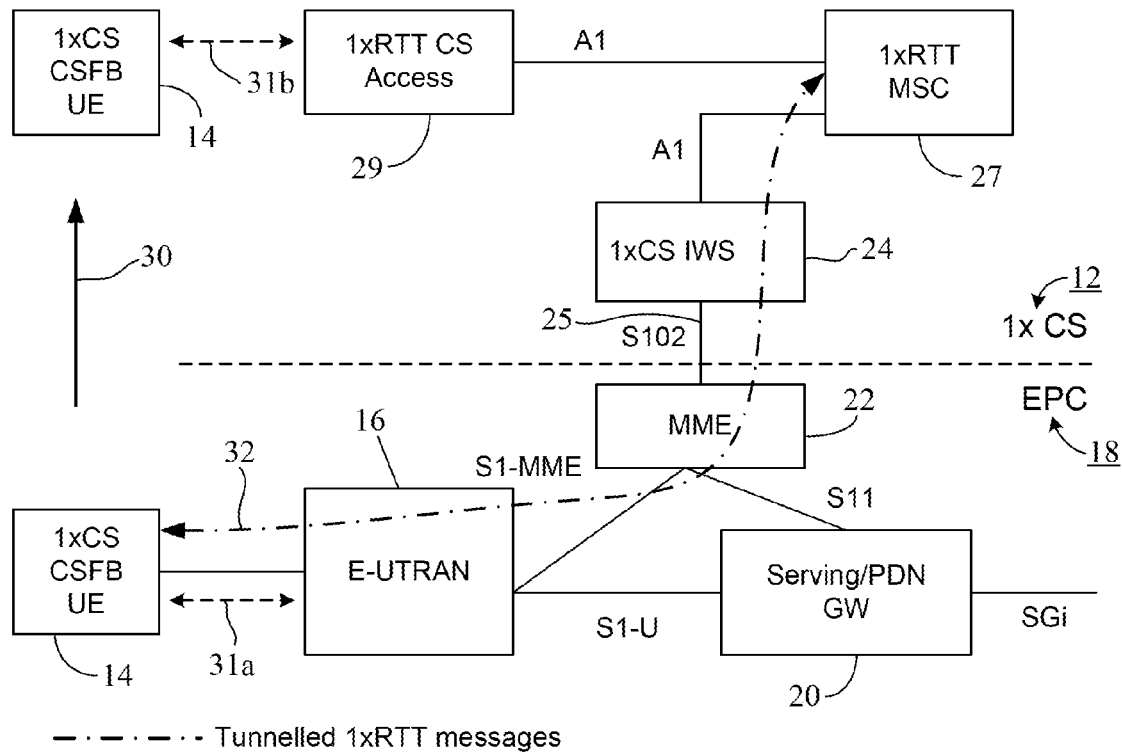
FIG. 1 illustrates an existing architecture to enable CSFB from LTE-based E-UTRAN access to CDMA 1xRTT CS domain access.
Figure 3:
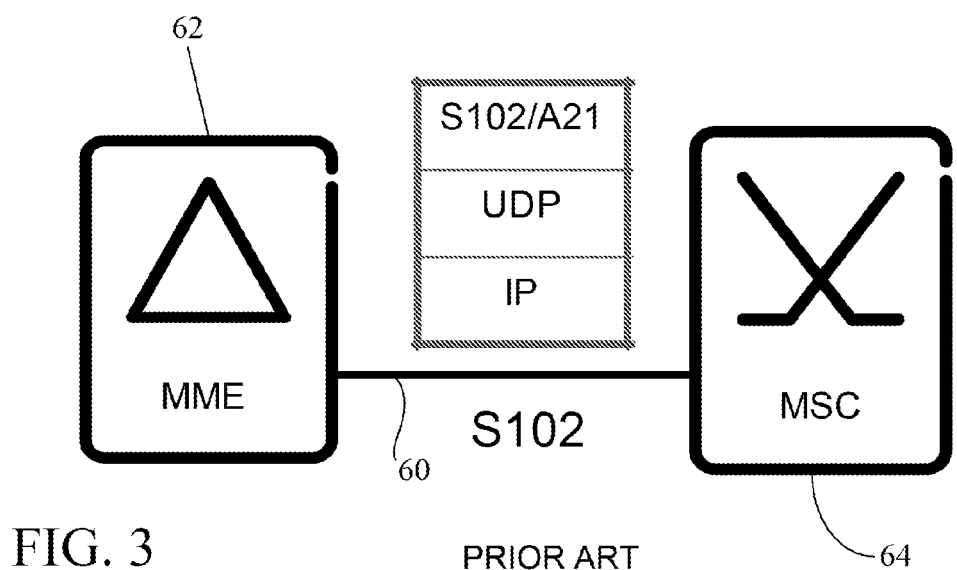
FIG. 3 shows general details of an exemplary S102 link between an MME and an MSC pool.
Figure 2:
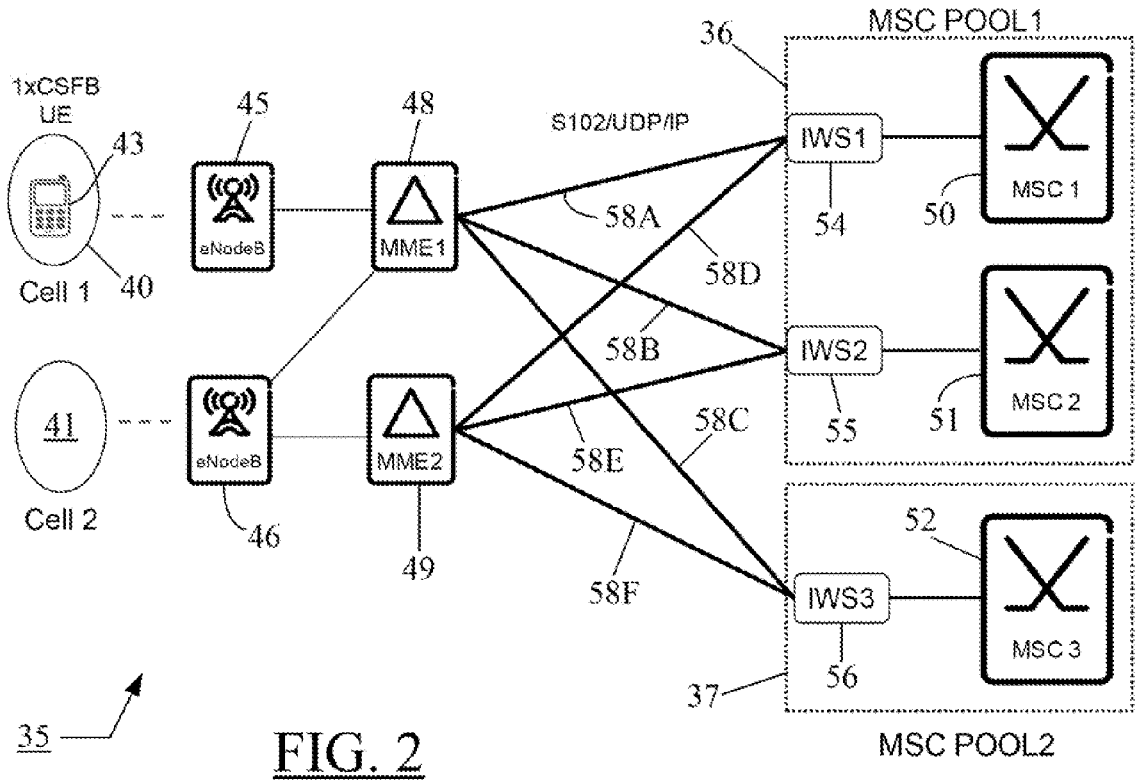
FIG. 2 illustrates an exemplary MSC pooling configuration in which two MSC pools are shown as serving two LTE cells.

FIG. 4 is an exemplary CSFB architecture 70 that addresses link failure detection and IWS relocation aspects according to particular embodiments of the present disclosure. The architecture 70 in FIG. 4 is substantially similar to the one shown in FIG. 1—i.e., both reference architectures relate to a CDMA-based CSFB solution. Therefore, for the sake of clarity and ease of discussion, the same reference numerals are used in FIGS. 1 and 4 to identify network elements or entities (e.g., E-UTRAN access network 16, CSFB-capable UE 14, 1xRTT switch 27, etc.) having the same or substantially identical characteristics or functionalities. These "common" network elements/entities are not discussed again in conjunction with FIG. 4 for the sake of brevity. It is observed here that although the configurations in FIGS. 1 and 4 are generally similar, the EPC network/domain 72 and the 1xCS network/domain 74 in FIG. 4 may be considered as modified versions of the corresponding networks 18 and 12 in FIG. 1 in the sense that networks 72, 74 may implement modified versions of respective end points of the S102 link 25—i.e., the MME 76 in FIG. 4 may be a modified version of the MME 22 in FIG. 1, and the 1xCS IWS 78 in FIG. 4 may be a modified version of the IWS 24 in FIG. 1. As discussed earlier, an S102 link may have two end points—one (i.e., an MME) in the EPC network, and the other (i.e., an IWS) in the 1xCS domain. The end points 76, 78 of the S102 link 25 in FIG. 4 may be configured according to particular embodiments of the present disclosure to provide support for link failure detection and IWS relocation/re-assignment as per the methodologies broadly illustrated in FIGS. 5 and 6A-6C.

Figure 5:
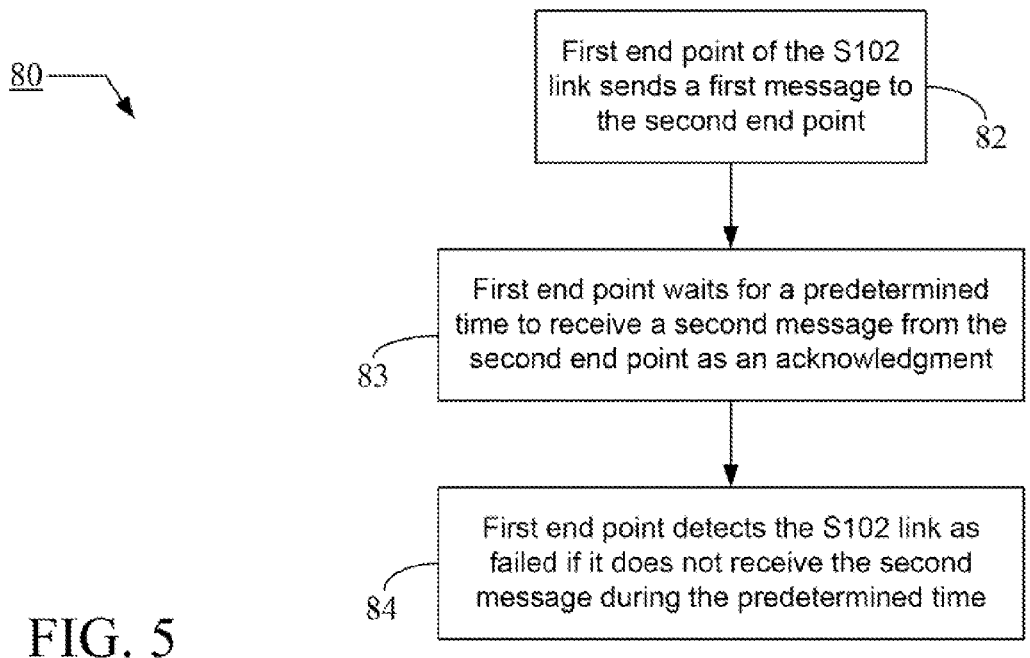
FIG. 5 shows an exemplary flowchart depicting how failure of an S102 link may be detected according to one embodiment of the present disclosure.

Prior to discussing FIGS. 5-6, certain additional aspects about the architecture 70 in FIG. 4 are briefly mentioned here. First, it is noted here that the terms "mobile handset," "wireless handset," "wireless device," "terminal," and "user equipment (UE)" may be used interchangeably herein to refer to a wireless communication device or mobile communication unit that is capable of voice and/or data communication via a wireless carrier network and is also capable of operation in a CSFB mode. Some examples of such mobile handsets/devices include cellular telephones or data transfer equipments (e.g., a Personal Digital Assistant (PDA)), smartphones (e.g., iPhone™, Android™, Blackberry™ etc.), computers, or any other similar type of user devices capable of operating in a wireless environment. Similarly, the terms "wireless network" or "carrier network" may be used interchangeably herein to refer to a wireless communication network (e.g., an LTE cellular network) facilitating voice and/or data communication between two user equipments (UEs). The carrier network may include a core network (e.g., the EPC network/domain 72) that provides logical and control functions (e.g., subscriber account management, billing, subscriber mobility management, etc.) and connection of one or more of the UEs 14 to other mobile handsets (not shown) operating in the carrier network and also to other communication devices (e.g., wireline or wireless phones) or resources (e.g., an Internet website) in other voice and/or data networks external to the carrier network. In that regard, as mentioned earlier, the core network 72 may be coupled to a packet-switched network (e.g., an Internet Protocol (IP) network such as the Internet) (not shown) via its S-GW/P-GW unit 20 as well as to a circuit-switched network (e.g., the 1xCS network 74) via the MME 76 to accomplish the desired connections beyond the devices operating in the LTE carrier network. It is understood that instead of a common gateway unit 20 shown in FIG. 4, separate gateway units may be present in the EPC domain 72 to separately implement the S-GW and P-GW functionalities.

As is understood, the UE 14 may be a subscriber unit in the respective LTE carrier network. However, as mentioned before, the present invention is operable in other wireless networks as well (whether voice networks, data networks, or both). Furthermore, portions of the EPC domain 72 may include, independently or in combination, any of the present or future wireline or wireless communication networks such as, for example, an IP Multimedia Subsystem (IMS) based network. Similarly, as also mentioned above, the EPC network 72 may be connected to the Internet or may include a portion of the Internet as part thereof. In one embodiment, a network may include more or less or different type of functional entities than those shown in the context of networks 72, 74 in FIG. 4.

It is noted here that the terms "network" or "domain" (e.g., in the context of the EPC network/domain 72 or the 1xCS network/domain 74) may be used interchangeably herein as evident from the context of discussion. Similarly, the terms "link" or "tunnel" may be used interchangeably in the context of the S102 interface 25 in FIG. 4 (and similar such interfaces in other figures). Furthermore, although the discussion herein relates to CDMA 1xRTT CS domain to LTE (more specifically, EPC network) based CSFB solution (which uses the S102 interface defined by 3GPP, which itself builds on the A21 interface (discussed later) described by 3GPP2), the terms such as "1xRTT," "1xCS," or "1x" may be occasionally omitted for the sake of brevity and clarity of discussion only. For example, the 1xCS IWS 78 may be referred to as IWS 78 and the 1xRTT MSC 27 may be referred to as MSC 27 merely for the sake of simplicity.

Referring again to FIG. 4, it is noted that the MSC 27 and the IWS 78 may form or may be part of an MSC pool (shown by a dotted oval with reference numeral "116") that deploys CSFB for the corresponding EPC network 72. In one embodiment, the MSC block 27 in FIG. 4 may represent the MSC's 121-122 in FIGS. 7-12, the IWS block 78 in FIG. 4 may represent the IWS's 114-115 in the MSC pool 116 discussed later with reference to FIGS. 7-12, and the MME 76 may be representative of the MME 112 in FIGS. 7-12. In that case, the S102 link 25 in FIG. 4 may represent individual S102 links 118-119 shown in FIGS. 7-12. (For ease of discussion, reference numeral "76" is used for an MME in a single MME-single IWS pair in FIG. 4, whereas a different reference numeral "112" is used for an MME coupled to two different IWS's in the embodiments of FIGS. 7-12. However, as mentioned here, both of these MME's may be the same in one embodiment.) Furthermore, in one embodiment, the MME 76 and/or the IWS 78 may be part of another network entity/element in the EPC network 72 or its functionality may be implemented through such other entity/element. Regardless of such different implementations of MME or IWS, the mechanisms of the present disclosure may be suitably implemented through the corresponding end points of the S102 tunnel 25 resulting from such different implementations. Thus, broadly speaking, the EPC network 72 and the 1xCS network 74 may be configured (through suitable configurations of each network-specific end point of the S102 link 25 as discussed below) to provide solutions to link failure detection and IWS relocation as per teachings of particular embodiments of the present disclosure. In one embodiment, one or more end points of the S102 link 25—i.e., the MME 76 and/or the IWS 78 in FIG. 4—may be configured (in hardware, via software, or both) to implement various methodologies (shown in FIGS. 5-12) as per teachings of the present disclosure. For example, when existing hardware architecture of an S102 end point cannot be modified, a particular methodology or solution approach according to one embodiment of the present disclosure may be implemented through suitable programming of one or more processors (e.g., processor 202 in FIG. 13) in the end point. The execution of the program code (by a processor in the S102 end point) may cause the processor to perform end point-specific aspects of the solutions taught in the present disclosure. Thus, in the discussion below, although a unit (whether the MME 76 or the IWS 78) or its corresponding network 72 or 74 may be referred to as "performing," "accomplishing," or "carrying out" a function or process, it is evident to one skilled in the art that such performance may be technically accomplished in hardware and/or software as desired.

Although various examples in the discussion below are provided primarily in the context of an LTE network to CDMA 1xRTT CSFB, the teachings of the present invention may equally apply, with suitable modifications (as may be apparent to one skilled in the art using the present teachings), to CSFB in a number of different networks or systems such as, for example, standard-based systems/networks using Third Generation (3G) or Fourth Generation (4G) specifications, or non-standard based systems. Some examples of such systems or networks include, but not limited to, Wideband Code Division Multiple Access (WCDMA) systems, WCDMA-based High Speed Packet Access (HSPA) systems, 3GPP2's CDMA based High Rate Packet Data (HRPD) systems, CDMA2000 or TIA/EIA IS-2000 systems, Evolution-Data Optimized (EV-DO) systems, Worldwide Interoperability for Microwave Access (WiMAX) systems based on Institute of Electrical and Electronics Engineers (IEEE) standard IEEE 802.16e, International Mobile Telecommunications-Advanced (IMT-Advanced) systems (e.g., LTE Advanced systems), other Universal Terrestrial Radio Access Networks (UTRAN) or Evolved-UTRAN (E-UTRAN) networks, etc.

FIG. 5 shows an exemplary flowchart 80 depicting how failure of an S102 link (e.g., the link 25 in FIG. 4) may be detected according to one embodiment of the present disclosure. Details of various steps illustrated in the flowchart 80 are provided later with reference to discussion of FIGS. 7-9. Initially, at block 82, a first end point (e.g., the MME 76 or the IWS 78) of the S102 link sends a first message (e.g., a "heartbeat" message discussed later below) to the second end point (e.g., the IWS 78 or the MME 76, as applicable). Thereafter, the first end point waits for a predetermined time to receive a second message (which could be an acknowledgement of the first message) from the second end point as shown at block 83. If the first end point does not receive the second message during the pre-determined time (possibly after a configurable number of retries), the first end point detects that the S102 link has failed (block 84). In this manner, link failure may be detected according to one embodiment of the present disclosure.

Figure 6B:
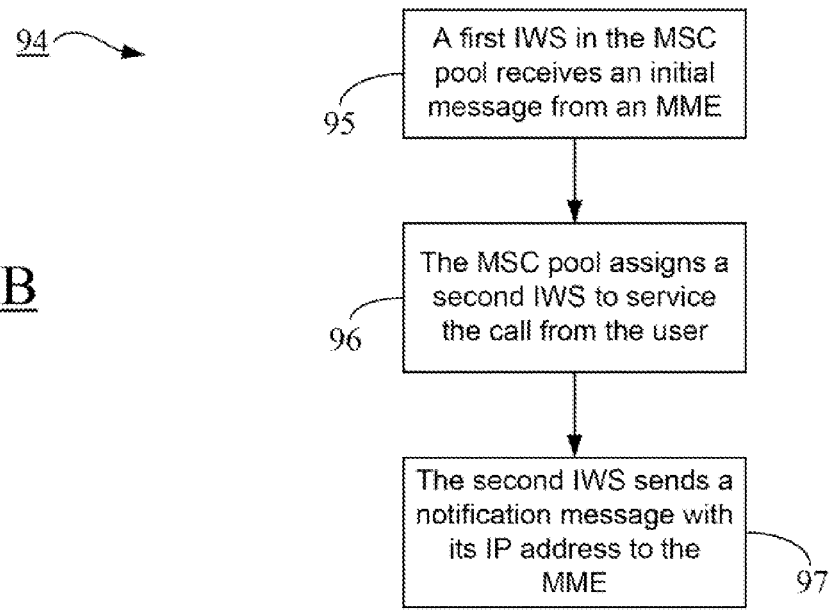
Figure 6C:
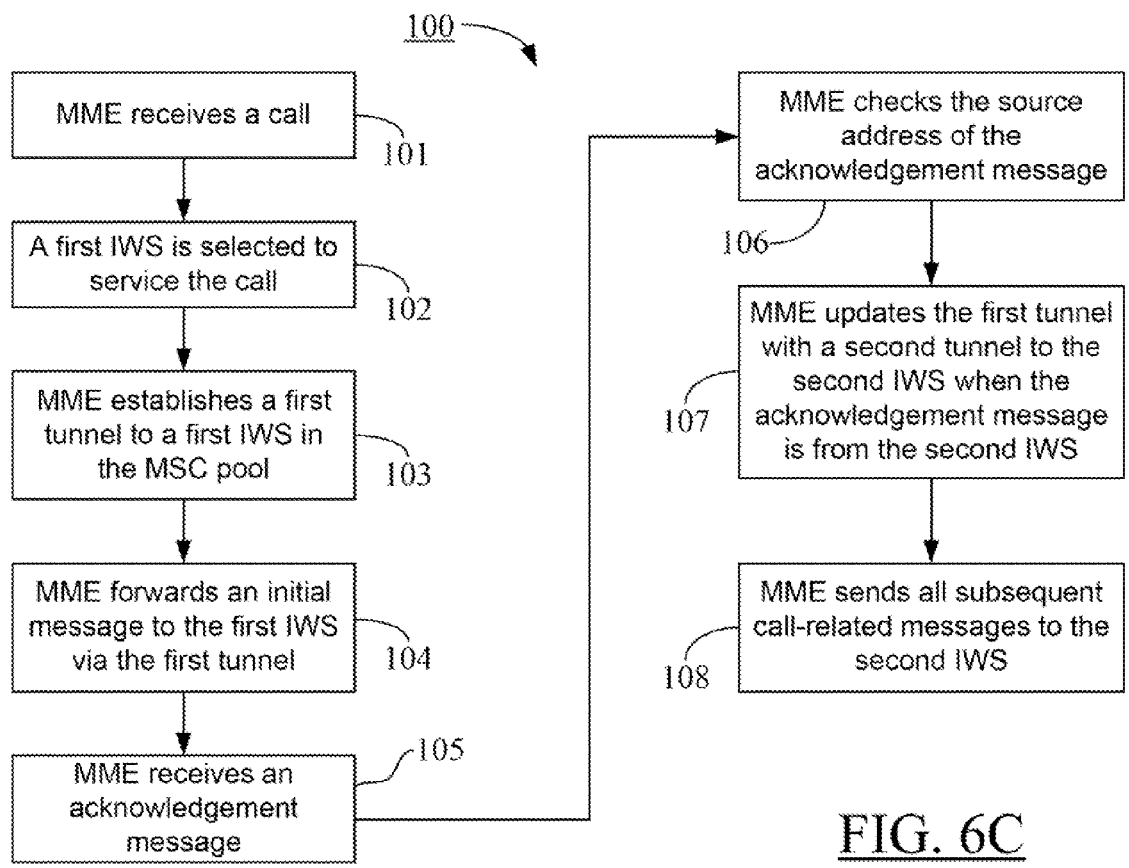
Figure 10:
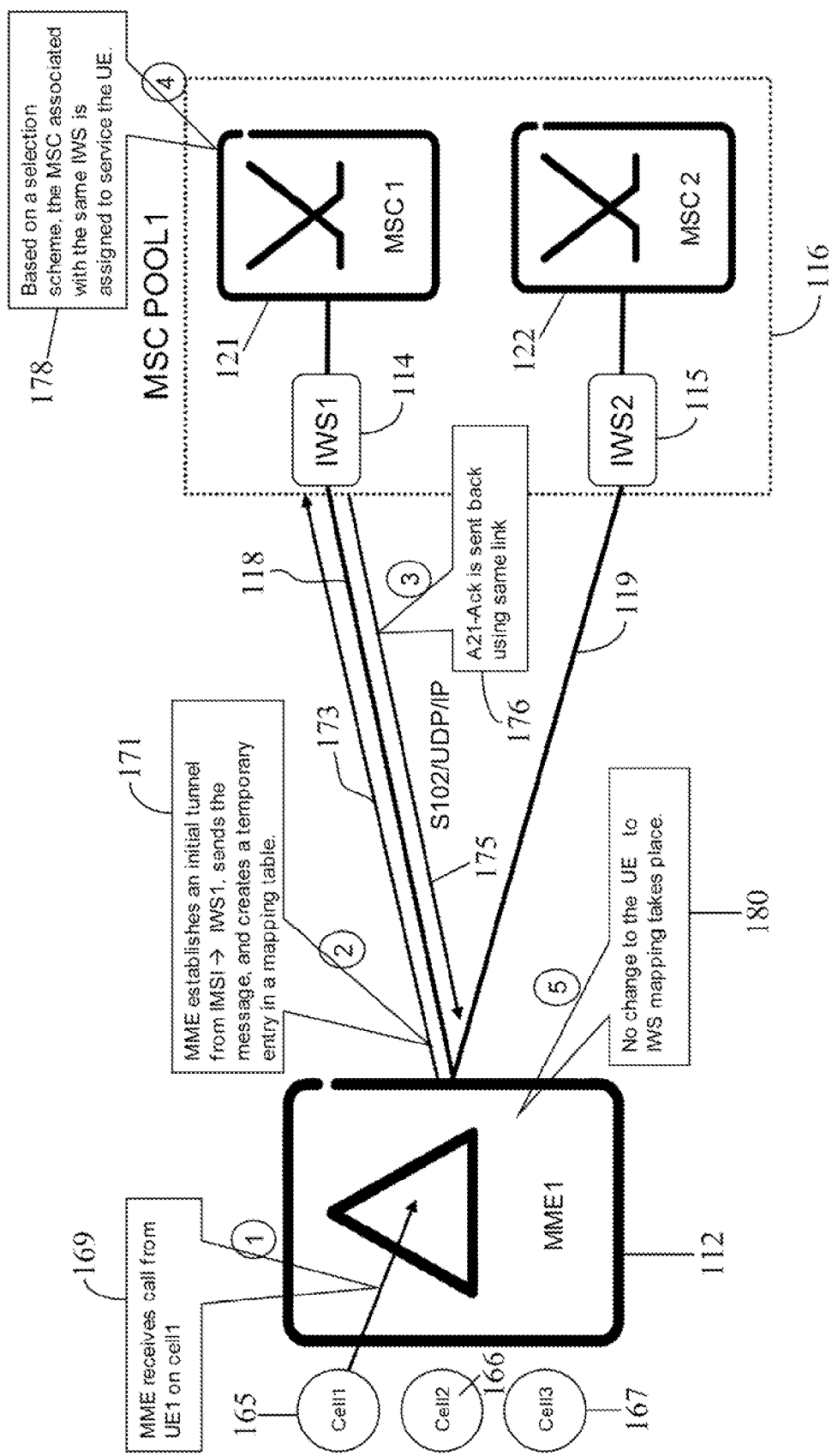
FIG. 10 shows exemplary messaging between an MME and an MSC pool according to one embodiment of the present disclosure to process a user's call in the absence of IWS relocation within the MSC pool.
Figure 11:
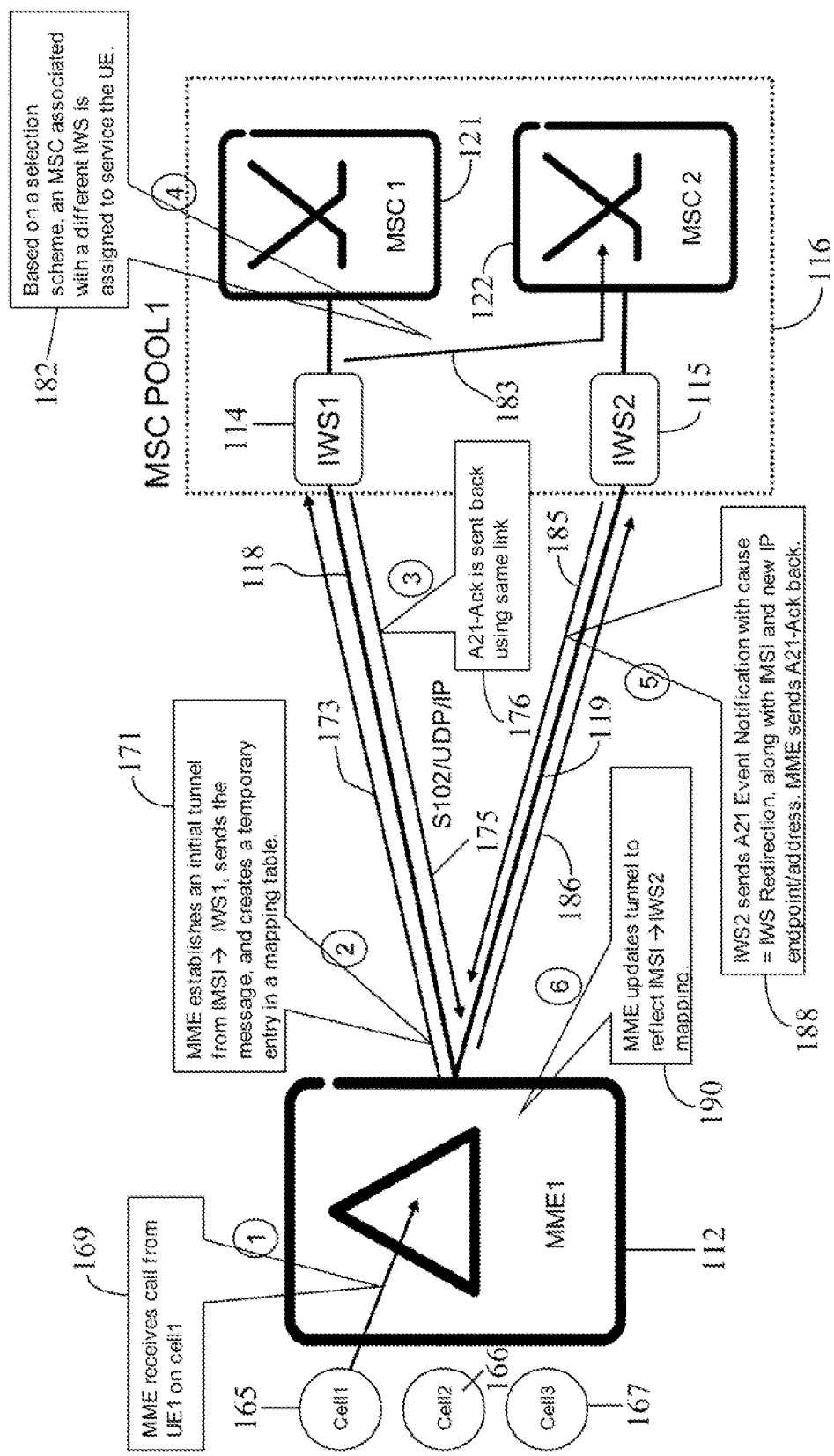
FIG. 11 illustrates an exemplary usage of the A21 Event Notification message between an MME and an MSC pool according to one embodiment of the present disclosure to update the MME with information about IWS relocation within the MSC pool.
Figure 12:
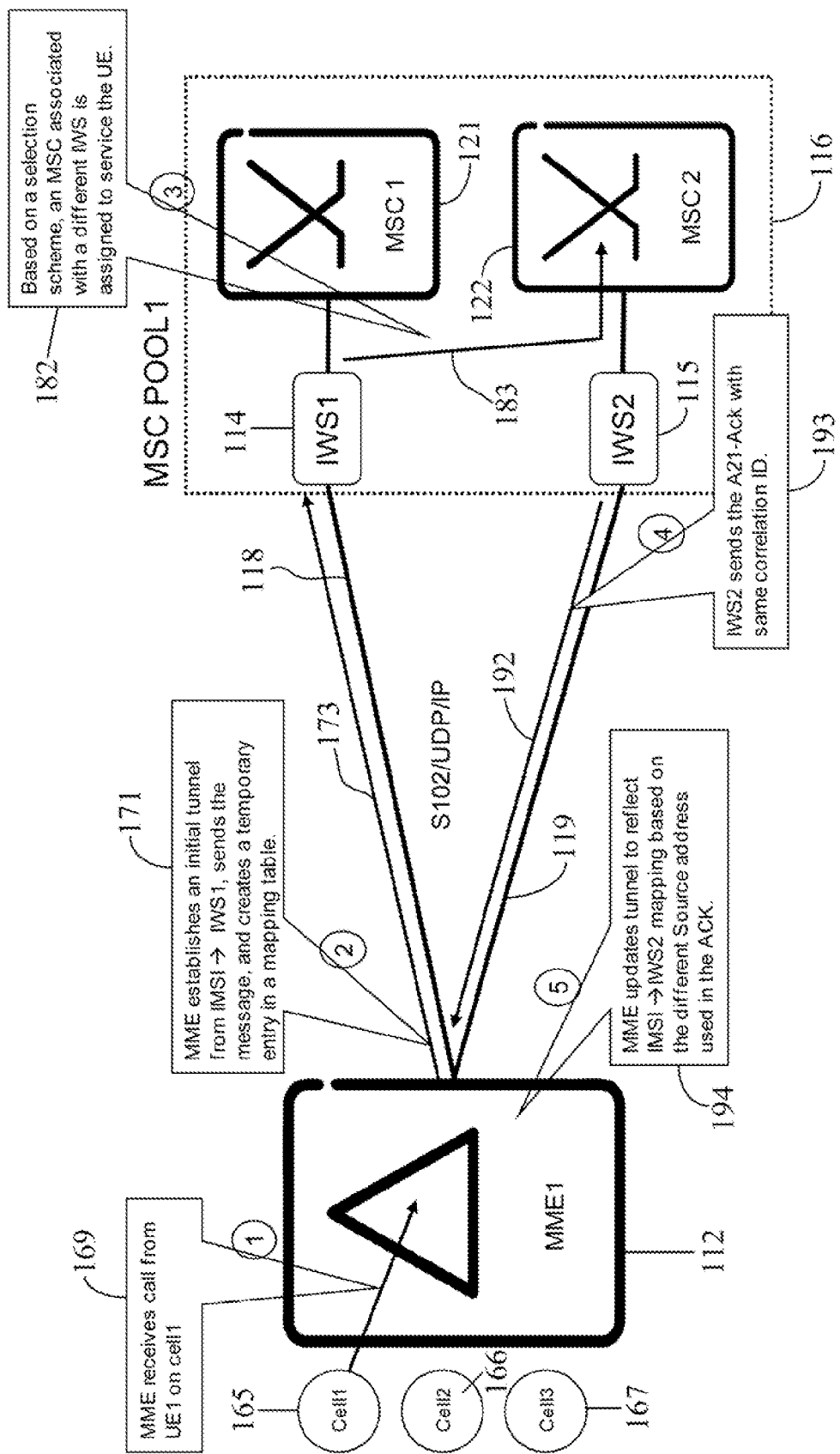
FIG. 12 shows another mechanism according to one embodiment of the present disclosure to update an MME with information about IWS relocation within an MSC pool.

FIGS. 6A-6C provide exemplary flowcharts 86, 94, and 100, respectively, according to particular embodiments of the present disclosure showing how an MME (e.g., the MME 76 in FIG. 4) in an EPC network (e.g., the EPC network 72) may be updated with information about relocation (or re-assignment) of IWS's within an MSC pool (e.g., an MSC pool (not shown) that includes the MSC 27 and the IWS 78 as well as at least one other MSC-IWS pair) that deploys CSFB for the EPC network. FIGS. 10-12 (discussed later) provide additional details of the methodologies shown in FIGS. 6A-6C.

In the embodiment of FIG. 6A, when an MME (e.g., the MME 76) receives an initial message as part of a call from a mobile communication unit (e.g., the UE 14) operating in the EPC network 72 (block 87), the EPC network 72 may "select"—possibly through the MME 76—an initial/first IWS (e.g., the IWS 78) in the legacy 1xCS network 74 to serve the call received at the MME 76 (block 88). As mentioned earlier, the LTE cell (not shown) of the UE 14 may be associated with a specific legacy 1xCS cell (not shown) to enable the EPC network 72 to determine a specific MSC-IWS pair in the legacy cell that would service the call from the user. Once the initial IWS from an MSC pool (not shown) is determined, the MME may establish a first S102 tunnel to the initial IWS to service the initial message (e.g., registration message for the legacy network) received from the UE 14 as part of the call therefrom (block 89). This first tunnel may map an identification (ID) of the UE 14 to an ID of this initial IWS, thereby enabling the MME to forward the initial message to the initial IWS via the first S102 tunnel/link (block 90). However, due to load-balancing, the MSC pool may select a serving MSC (and its associated serving IWS) to receive and process the initial message (and subsequent messages in the call from the UE). This serving IWS may be different from the initial IWS. Therefore, in one embodiment, in response to the message forwarding at block 90, the MME may receive a notification message from the serving IWS (and not from the initially-selected IWS) as indicated at block 91. In response to the notification message, the MME may update the first S102 tunnel with a second S102 tunnel to the serving IWS (block 92). The second tunnel may replace the mapping in the first tunnel with a mapping from the ID of the UE to an ID of the serving IWS, thereby enabling the MME to now send call-related messages from the UE to the (proper) serving IWS without triggering inefficient and time-consuming bouncing of messages within the MSC pool. The notification message (from the serving IWS) thus allows updating the MME with the information about re-assignment of MSC's (and corresponding IWS's) within the MSC pool so as to enable the MME to direct a user's call to the proper IWS.

The flowchart 94 in FIG. 6B is related to that in FIG. 6A, but illustrates the steps 95-97 from the point of view of an IWS (or MSC pool) instead of an MME (as in case of the flowchart 86 in FIG. 6A). As shown at block 95 in FIG. 6B, a first IWS (i.e., the IWS initially-selected by the EPC network to service the initial message from the UE) in the MSC pool receives the initial message from the MME via a first S102 tunnel between the MME and this first IWS. Thereafter, due to load-balancing, the MSC pool may assign a second (different) IWS to service the call from the user (block 96). In view of such re-assignment of IWS's within the MSC pool, the second/serving IWS may now send a notification message to the MME using a second S102 tunnel (that is different from the first S102 tunnel between the MME and the first IWS). As indicated at block 97, the notification message may contain the ID of the second IWS—e.g., in the form of the IP address of the second IWS. The notification message thus allows the MME to send all subsequent call-related messages from the UE to the second IWS only via the second tunnel—i.e., without involving the first IWS.

FIG. 6C illustrates a flowchart 100 according to another embodiment of the present disclosure addressing the IWS relocation issue in an MSC pool. Blocks 101-104 in FIG. 6C are identical to blocks 87-90 in FIG. 6A and, hence, are not described here for the sake of brevity. However, instead of a notification message as in case of the block 91 in FIG. 6A, at block 105 ion FIG. 6C, the MME may receive an acknowledgement message corresponding to the MME-sent initial message at block 104. The MME may then check the source address of the acknowledgement message (block 106) to determine whether the acknowledgement message is from the first IWS (i.e., the EPC network-selected initial IWS) or the second IWS (i.e., the MSC-pool selected serving IWS). The source address may contain ID of the appropriate IWS sending the acknowledgement. Upon determining that the acknowledgement message is from the second (i.e., MSC-pool selected) IWS, the MME may update the first tunnel (to the first/initially-selected IWS) with a second tunnel to the (re-assigned) serving IWS (block 107). As mentioned earlier, the second tunnel may replace the UE-to-first IWS mapping in the first tunnel with a UE-to-second IWS mapping, thereby enabling the MME to now send call-related messages from the UE to the (proper) serving IWS without triggering inefficient and time-consuming bouncing of messages within the MSC pool. The MME may then send all subsequent call-related messages to the serving/second IWS as indicated at block 108.

Figure 7:
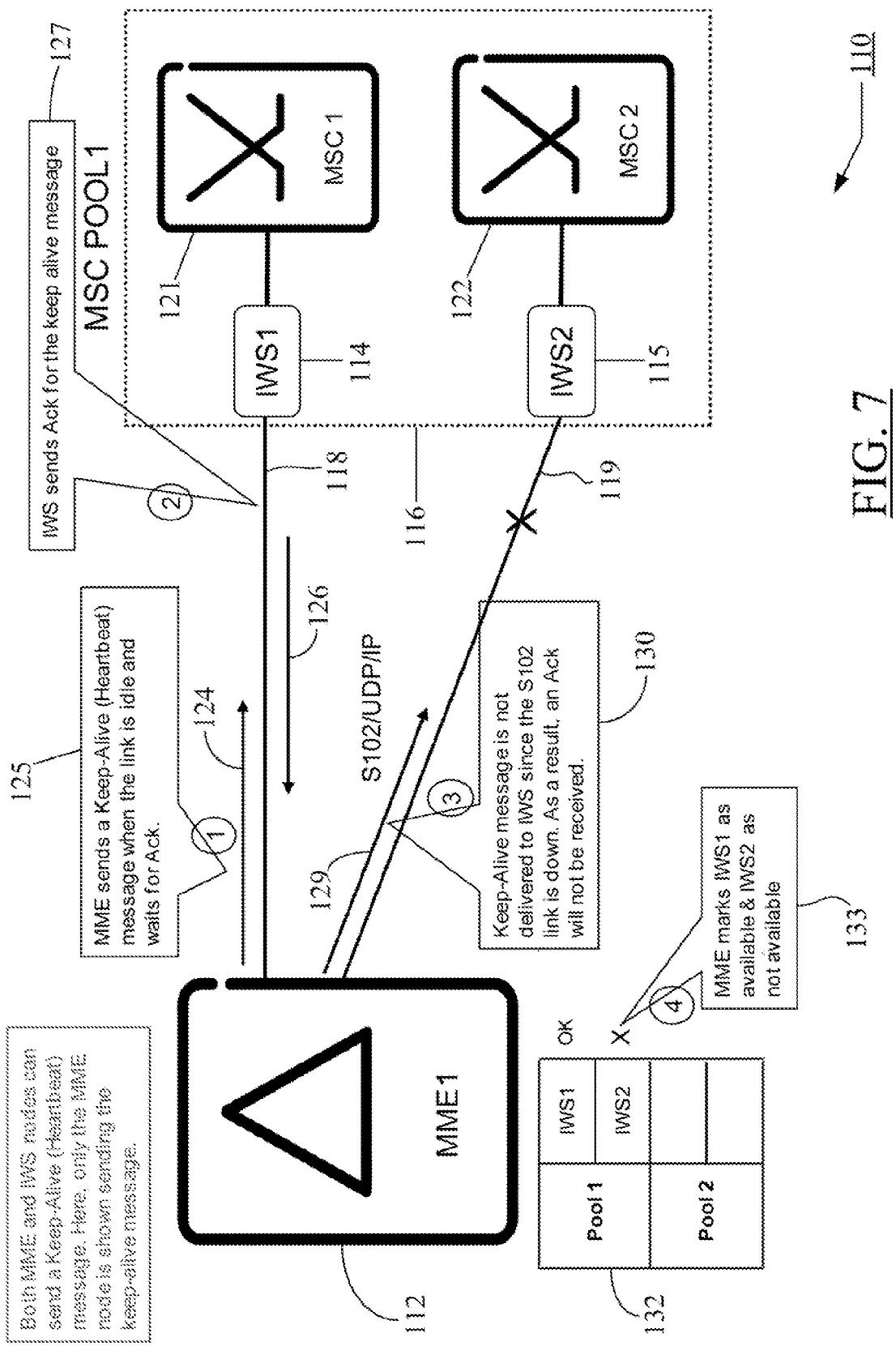
FIG. 7 illustrates a heartbeat mechanism according to one embodiment of the present disclosure for detection of failure of an S102 link.

FIG. 7 illustrates a heartbeat mechanism 110 according to one embodiment of the present disclosure for detection of failure of an S102 link. FIG. 7 shows an exemplary MME 112 (which may be functionally similar to the MME 76 in FIG. 4) coupled to two IWS's 114, 115 in an MSC pool 116 via respective S102 links 118, 119. Each such IWS 114, 115 may be functionally similar to the IWS 78 shown in FIG. 4 and, although not individually shown in FIG. 4, IWS's 114-115 also may be part of the 1xCS network 74 (by being part of the MSC pool 116 shown in FIG. 4). Further, as mentioned earlier, each S102 link 118-119 may be similar to the S102 link 25 shown in the generic architecture 70 of FIG. 4. Each IWS 114-115 is shown associated with its corresponding MSC 121, 122 (which may be part of the 1xCS network 74 as well through the MSC pool 116 shown in FIG. 4). Similarly, although not individually shown in FIG. 4, the MME 112 of FIG. 7 may be part of the EPC network 72 as well (e.g., when the MME 76 is considered as representative of the MME 112 for ease of discussion). As mentioned earlier, there may be more than one IWS associated with a switch in an MSC pool; however, for the sake of clarity, only one IWS per switch is shown for the MSC pool 116 in FIG. 7. As also described earlier, the purpose of MSC pooling is to maximize network robustness—i.e., the failure of S102 links or an entire MSC should be handled by re-routing the traffic to an alternate MSC in the pool. However, the S102 interface is defined based on the UDP protocol, which does not have an internal reliability mechanism. Therefore, as illustrated in the embodiment of FIG. 7, a "heartbeat" (or echo request) mechanism may be used to detect when an S102 link has failed. As shown in FIG. 7, in case of the S102 link 118, a heartbeat or keep-alive message is sent from one end of the S102 link 118 (i.e., from the MME 112) to the other end (i.e., to the IWS 114) as indicated by arrow 124 and text box 125. In response, the other end must send an acknowledgement (Ack) within a pre-determined time (as configured, for example, by the respective network operator). Such response is illustrated by arrow 126 in FIG. 7 and described in the text box 127.

It is noted here that both MME and IWS can send a respective keep-alive (or heartbeat) message, and the other node would then respond with its "Ack" message. However, for ease of illustration, only the MME node is shown sending the keep-alive message in FIG. 7. It may be preferable to send the heartbeat message only when the respective S102 link is idle. (At other times, regular traffic on the link would be used to implicitly fulfill the Heartbeat purpose). However, if design considerations warrant, the heartbeat mechanism can be "activated" randomly at dynamically-selected events or at any other suitable "monitoring" event desired by collaboration between EPC (or LTE) and 1xCS network operators.

In one embodiment, a timer (in the heartbeat-sending node) may be used to decide when an Ack has not been received in a timely manner and is considered "lost." The heartbeat-sending node may again send a heartbeat message after waiting for a pre-determined time or at another suitable time (e.g., when there is no user traffic to send on the link under "test"). After the loss of a configurable number of heartbeat messages, the respective S102 link is marked "down" (in the heartbeat-sending node) and alternate links may be used to re-route the traffic until the "down" link again successfully passes the heartbeat/echo messages (which the sender node may continue to send occasionally as per design considerations despite not receiving Acks from the other end of the S102 link). In the context of the S102 link 119 in FIG. 7, it is observed that the MME 112 may not receive an Ack from the IWS 115 because MME's keep-alive message (indicated by arrow 129 in FIG. 7) is not delivered to the IWS 115 due to S102 link 119 being down (as noted in text box 130 and indicated by an "X" placed on the link 119). Thus, in the embodiment of FIG. 7, the MME 112 may "mark" IWS 114 as "OK" or "available" whereas IWS 115 as "not available" in the MSC pool 116. The MME 112 may perform such link status entries (or update the link status based on most-recent results of the heartbeat test) in an internal MME-specific link-status table (e.g., the exemplary table 132 shown in FIG. 7) as indicated at text box 133 in FIG. 7. As mentioned before, an IWS may perform similar actions as well—i.e., all of the heartbeat-related discussion in the context of the MME 112 in FIG. 7 may equally apply to either of the IWS's 114-115 in the MSC pool 116.

In an alternative embodiment, during a given time period, the heartbeat-sending node (e.g., the MME 112 or any of the IWS's 114-115) may send a pre-determined number of heartbeat messages—each being sent at a configurable interval—without necessarily waiting for any acknowledgements from the heartbeat-receiving node. In this embodiment, the recipient node may not even need to send any acknowledgements because the recipient may consider the link as "down" if it fails to receive more than a specific number ("N") of consecutive heartbeats from the sender node. (Because the link is "down," even if acknowledgements are sent from the recipient node, they would not reach the sender node within a pre-determined time. Hence, the sender node will also consider the link as "down".)

It is noted here that numbered text boxes in FIGS. 7-12 (e.g., text boxes 125, 130, etc., in FIG. 7, and similar other text boxes in FIGS. 8-12 discussed below) are for explanatory purpose only; they do not suggest or mandate any specific order of steps or messaging sequence unless as discussed with reference to each figure. Furthermore, for ease of discussion, the same reference numerals are used throughout FIGS. 7-12 to identify the same or similar entity/function. Thus, even though the S102 link between the MME 112 and IWS 115 is assumed to be "down" in the illustrative embodiments of FIGS. 7-9 and "up" in the exemplary embodiments of FIGS. 10-12, the same reference numeral "119" is used throughout these figures to refer to that S102 link for ease of discussion.

FIGS. 8A-8B illustrate exemplary messages that may be used to implement a heartbeat mechanism according to one embodiment of the present disclosure. As mentioned before, either of the S102 end points—i.e., MME 112 and IWS's 1114-115 in FIG. 7—may send and receive heartbeat messages. Therefore, FIGS. 8A and 8B are provided to illustrate messaging from different S102 end points. In FIG. 8A, the MME 112 is the heartbeat-sending node, whereas in FIG. 8B, each of the IWS's 114-115 is a heartbeat-sending node. It is noted that the messages shown in FIGS. 8 and 9 are exemplary embodiments for the heartbeat mechanism generally shown in FIG. 7; they are not meant to be an exhaustive list. Furthermore, although the present disclosure is provided with specific reference to the CDMA 1xRTT to LTE based CSFB solution (which uses the S102 interface defined by 3GPP, which interface itself builds on the A21 interface defined by 3GPP2), the heartbeat mechanism of the present disclosure may be applied to other CSFB technologies as well, such as the ones for GSM, WCDMA based Universal Mobile Telecommunications System (UMTS), or HRPD equivalents.

Prior to discussing the messaging in FIGS. 8A-8B, the following provides a brief overview of the A21 interface (which is defined in detail in the earlier-mentioned 3GPP2 TSG document A.S0008-C). The A21 interface carries signaling information between an A21 endpoint in a given technology (e.g., an MME in E-UTRAN) and an IWS in a 1xCS network over a specified interface that supports A21 signaling (e.g., an S102 link). The A21 interface consists of a number of different messages such as, for example, A21-1x Air Interface Signaling message, an A21-Ack message, an A21-1x Parameters Message, an A21-Event Notification message, etc. The A21 interface provides the ability to transfer call establishment messaging for a UE that is attached to another packet-switched technology (e.g., E-UTRAN) for a 1x-CS voice call. The IWS and the end point for another technology (e.g., an MME) may communicate across the A21 interface to setup and facilitate transfer of an MS/UE that is attached to a packet-switched technology (e.g., E-UTRAN) to a 1xBS for the purpose of receiving circuit-switched services. The end point for another technology (e.g., an MME) and a 1x-CS IWS may communicate across the A21 interface to provide 1x information to the MS/UE that it requires to originate or terminate a 1xCS voice call when it is attached to another packet-switched technology (e.g., E-UTRAN).

FIG. 8A shows an A21-1x Parameters Request message being sent from the MME 112 to the IWS's 114-115 as the heartbeat messages (as indicated by arrows 135 and 136 in FIG. 8A), whereas FIG. 8B shows an A21-1x Parameters messages being sent from the IWS's 114-115 to the MME 112 as the heartbeat messages (as indicated by arrows 137 and 138 in FIG. 8B). Each A21 message may contain a corresponding "CorrelationID" Information Element (IE). Upon receiving either message, the receiver node may send an A21-Ack message with the same CorrelationID value as that in the corresponding heartbeat message, but with "A21 Cause" IE set to the value "unspecified" as indicated by arrows 139 and 140 in FIGS. 8A-8B, respectively. The receipt of the A21-Ack implies to the heartbeat-sender node that the corresponding S102 link—i.e., the link 118 in FIGS. 8A-8B—is active as indicated by text boxes 142 and 143. However, in case of the S102 link 119, the receiver node may not receive the corresponding heartbeat message (A21-Parameters Request or A21-Parameters) because the link 119 may be "down" as discussed earlier with reference to FIG. 7. In that case, the heartbeat-sender node may not receive any A21-Ack, prompting the node to retry its request (with the same CorrelationID value) for a specific number ("N") of retries. If no response is received after N retries, the link is declared "down" as indicated at text boxes 145-146. As discussed with reference to table 132 in FIG. 7, the heartbeat-sender node may "mark" the link 119 as "unavailable" in an internal table in the node.

It is observed here that the current standards for the S102 interface do not specify the use of the A21-Parameters Request or A21-Parameters messages over an S102 interface. (Other A21 messages not supported over the current S102 interface include, for example, the A21-Service Request and A21-Service Response messages.) However, the standards support the use of A21-1x Air Interface Signaling, A21-Ack, and A21-Event Notification messages over an S102 interface. (More generally, current specifications for the S102 interface support only those A21 messages that are referenced by earlier-mentioned 3GPP TS 29.277 (S102).) Therefore, although the A21-Parameters Request and A21-Parameters messages are used as heartbeat messages in FIGS. 8A-8B, the receiver node may reject these messages with an A21-Ack message (which is supported in the current standards) having "unspecified" as the value for the "A21 Cause" IE in the A21-Ack message as indicated at text box 148 in FIG. 8A. In any event, as mentioned earlier, the receipt of the A21-Ack message at the heartbeat-sender node would imply that the corresponding S102 link is active.

It is noted here that the A21-1x Parameters Request and A21-1x Parameters Messages may be the only A21 request messages not relating to a particular UE. However, in one embodiment, an A21-Event Notification message—which is normally sent on a per-UE basis—also may be used as a heartbeat message with the re-use of its existing cause codes or one of the reserved cause codes.

FIGS. 9A-9B depict additional exemplary messages that may be used to implement a heartbeat mechanism according to one embodiment of the present disclosure. Like FIGS. 8A-8B, FIGS. 9A-9B show heartbeat messaging from different endpoints of an S102 tunnel—from MME to IWS in case of FIG. 9A and from IWS to MME in case of FIG. 9B. Because of substantial similarity between illustrations in FIGS. 8A-8B and those in FIGS. 9A-9B, only a brief discussion of FIGS. 9A-9B is provided herein for the sake of brevity. In the embodiments of FIGS. 9A-9B, a proprietary application layer heartbeat message set—containing "A21-Heartbeat" and "A21-heartbeatAck" messages—may be defined for an S102 interface to detect a failed S102 link. The A21-Heartbeat message may be sent from the heartbeat-sender node (as indicated by arrows 150-153 in FIGS. 9A-9B) and a respective A21-HeartbeatAck message may be sent by the other node as an acknowledgement of the A21-Heartbeat message (as indicated by arrows 155-156). Text boxes 158-160 further explain this mechanism. When a link is down (e.g., the S102 link 119 in FIGS. 9A-9B), the heartbeat-sender node may not receive any A21-HeartbeatAck message in response. In that case, the link may be declared "down" or "unavailable" after N retries as discussed before and as indicated by text boxes 162-163 in FIGS. 9A-9B, respectively. In one embodiment, instead of the A21-HeartbeatAck message, the existing A21-Ack may be used to acknowledge the A21-Heartbeat message.

In one embodiment, an Internet Control Message Protocol (ICMP) request and reply messages may be used to implement the heartbeat (or keep-alive) mechanism according to the teachings of the present disclosure. Each S102 endpoint or node (e.g., the MME 76 and the IWS 78 in the embodiment of FIG. 4) may send an ICMP echo request and await for an ICMP echo reply. An S102 link may be considered "down" when the ICMP reply is not received after N retries. However, strictly speaking, this approach may not be preferable because it actually detects an IP layer failure, and not S102 application layer failures. The S102 application layer can be out of service while the IP layer is still fine. Similarly, a Bidirectional Forwarding Detection (BFD) based heartbeat mechanism may be implemented. However, BFD is designed to detect connectivity failure in the forwarding plane, and does not address S102 application layer failure. Therefore, like ICMP, BFD also may not be preferable either for accurately detecting S102 link failures.

In a further embodiment, a Stream Control Transmission Protocol (SCTP) based link may be used between a first endpoint in the EPC network 72 (e.g., the MME 76 in FIG. 4) and a second endpoint in the 1xCS network 74 (e.g., the IWS 78 in FIG. 4) instead of a UDP-based link (e.g., the S102 link 25 as is currently defined in existing standards) because SCTP already provides heartbeat capability. For example, the standards may be amended so that the S102 link 25 is now defined to be based on SCTP instead of UDP. This may be a desirable option in terms of link management because SCTP is a modern, message-oriented protocol that ensures reliable, in-sequence transport of messages with congestion control. However, re-configuring or re-implementing current UDP-based S102 links to SCTP-based interfaces represents a significant amount of work. Furthermore, such reconfiguration is generally a function of the underlying platform, and is outside direct control of the application layer (i.e., S102 or other similar application layer) that is running the messaging tunnel. Therefore, replacement of UDP-based interfaces with SCTP-based interfaces also may not satisfy application layer failures without significant work.

FIG. 10 shows exemplary messaging between an MME (e.g., the MME 112 in FIG. 7) and an MSC pool (e.g., the MSC pool 116 in FIG. 7) according to one embodiment of the present disclosure to process a user's call in the absence of IWS relocation within the MSC pool 116. The MME 112 may receive a call from a UE (like the UE 14 in FIG. 4) operating in one of the LTE cells 165-167 served by the corresponding EPC network (like the EPC network 72 in FIG. 4) of which the MME 112 is a part. Such call receipt is indicated by text box 169 in FIG. 10. The MME 112 may receive an initial message (e.g., a registration message to register the UE to the 1xCS network) as part of the call from the UE. As mentioned earlier, the EPC network may then select (e.g., through the MME 112) an IWS (e.g., the IWS 114) to service the initial message from the user. As indicated at text box 171, the MME 112 may establish an initial tunnel (over the S102 link 118) between an ID associated with the call-sending UE (e.g., an International Mobile Subscriber Identity (IMSI) of the UE) and the ID of the EPC network-selected IWS 114 (e.g., an IP address of the IWS 114), send the initial message from the UE to the selected IWS 114 (as indicated by arrow 173 in FIG. 10), and create a temporary entry in a mapping table (inside the MME 112) (not shown) mapping the UE's ID to the ID of the IWS 114—so as to enable the MME 112 to send subsequent messages from the UE to the same IWS 114. The IWS 114 may acknowledge receipt of the initial message by sending back an A21-Ack message using the same S102 link 118, as indicated by arrow 175 and text box 176. If the MSC pool 116 assigns the MSC 121—i.e., the MSC associated with the same IWS as that initially selected by the EPC network—to service the UE's call (as indicated by text box 178), then there is no need to change UE to IWS mapping in the MME (as indicated by text box 180) according to one embodiment of the present disclosure. In other words, the MSC pool's MSC selection scheme (based on load-balancing considerations) results in no IWS relocation or re-assignment within the MSC pool 116. In that case, the MME 112 would continue to send subsequent call-related messages to the IWS 114 assigned by the MSC pool 116 (and also initially selected by the EPC network), without triggering any message-bouncing within the MSC pool 116.

As noted earlier, the S102 link between the MME 112 and IWS 115 is assumed to be "down" (or "unavailable") in the illustrative embodiments of FIGS. 7-9 and "up" (or "available") in the exemplary embodiments of FIGS. 10-12. However, for ease of discussion, the same reference numeral "119" is used throughout these figures to refer to that S102 link.

As mentioned before, in the existing EPC network configurations, once the initial IWS is selected, subsequent messages for that user will be sent to the same IWS. However, in a pooled environment, load balancing actions within the MSC pool may result in the assignment of an IWS (the serving IWS) that is different than the one the EPC network initially selected for delivery of the messages. Thus, under the existing message delivery scheme, bouncing of messages may occur within the MSC pool because the EPC (i.e., the respective MME) is not updated with the information about the re-assignment of IWS's in the MSC pool. In case of the embodiment in FIG. 10, such updating is not needed because of absence of any IWS relocation (or re-assignment). However, IWS relocation is present in the embodiments of FIGS. 11-12, which illustrate two exemplary messaging schemes for updating an MME in view of such IWS relocation. As before, although FIGS. 11-12 are discussed with specific reference to the CDMA 1xRTT to LTE based CSFB solution, the MME/EPC updating mechanisms of those figures may be applied to other CSFB technologies as well, such as HRPD or equivalents.

FIG. 11 illustrates an exemplary usage of the A21 Event Notification message between an MME (e.g., the MME 112) and an MSC pool (e.g., the MSC pool 116) according to one embodiment of the present disclosure to update the MME with information about IWS relocation within the MSC pool. In FIG. 11, the initial messaging and initial tunnel establishment (e.g., by simply the logical selection and saving of the MME/IMSI to IWS link) identified by reference numerals 169, 171, 173, 175, and 176 is the same as that discussed before with reference to FIG. 10 and, hence, such messaging is not further discussed here for the sake of brevity. However, contrary to the embodiment in FIG. 10, there is IWS relocation (or re-assignment) within the MSC pool 116 in the embodiment of FIG. 11—i.e., an MSC selection scheme (based on load-balancing considerations) in the MSC pool 116 results in the MSC pool's selection of a different MSC (e.g., the MSC 122) to service the call from the UE (operating in cell 165) than the MSC (e.g., the MSC 121) associated with the initial, EPC network-selected IWS 114. Such MSC re-assignment is mentioned in the text box 182 and indicated by arrow 183 in FIG. 11. (In one embodiment, the MSC pool may perform selection of the serving MSC (and, hence, selection of the corresponding serving IWS) at the time of receipt of the initial message at original IWS 114.) To inform the MME 112 of such re-assignment and, hence, to enable the MME 112 to send future call-related messages to the new IWS 115 (associated with the MSC pool-selected MSC 122) to avoid bouncing of messages within the MSC pool 116, the embodiment in FIG. 11 follows the same S102 Redirection paradigm as is currently used to "inform" the MSC pool when an EPC endpoint (i.e., an MME) changes. The existing specifications provide for an A21 Event Notification message from an MME to the MSC pool as part of such S102 Redirection. However, the embodiment of FIG. 11 uses the A21 Event Notification message in the reverse direction—i.e., from the MSC pool to an MME. Thus, as shown in FIG. 11, current standards may be updated so that upon delivery of the UE's initial message (sent at step 173) to the re-assigned MSC 122 (as indicated by arrow 183), the corresponding IWS (i.e., the IWS 115) may send an A21 Event Notification message to the MME 112 containing "cause" IE indicating "IWS Redirection" or "IWS Re-Assignment" as indicated by arrow 185. In one embodiment, the re-assigned MSC 122 may "instruct" or "trigger" its associated IWS 115 to send the Event Notification message. In another embodiment, an MSC pool controller (not shown) may "trigger" the IWS 115 to send the Event Notification message upon MSC re-assignment. The Event Notification message from the IWS 115 to the MME 112 may also contain the IMSI of the UE (whose call is being processed) along with the IP address of the IWS 115 (i.e., the new endpoint in the MSC pool 116 now assigned to service the UE's call). In response to the A21 Event Notification message from the IWS 115, the MME 112 sends an A21-Ack message back to the IWS 115 as indicated by arrow 186 and text box 188.

In addition to sending the A21-Ack message 186 to the re-assigned IWS 115, the MME 112 may also update the initially established tunnel (which reflected a mapping from the IMSI of the UE to the IP address of the initially-selected IWS 114 as indicated at text box 171) with a new tunnel (over the S102 link 119) that now reflects the mapping from UE's IMSI to the IP address of the newly-assigned IWS 115, as indicated at text box 190. Thus, using the A21 Event Notification (carrying the address of the newly-assigned IWS to the appropriate MME) in the reverse direction—i.e., from an IWS to an MME, the MME (here, the MME 112) may be updated with information about re-assignment of IWS's within the MSC pool 116 so as to enable the MME 112 to send subsequent call-related messages directly to the newly-assigned IWS 115 (and not to the initially-selected IWS 114), thereby preventing bouncing of messages within the MSC pool 116.

It is noted that the messaging mechanism in FIG. 11 may introduce an extra message exchange (indicated by arrows 185-186) between the MME 112 and the newly-assigned IWS 115 (because the MME 112 had already earlier acknowledged its link with the initial IWS 114 through messaging at steps 173, 175). However, such "extra" messaging may occur only when a relocation is detected (typically on a new registration request from a UE), and not for every message sent from the MME/EPC. In other words, the messages 185-186 may be only sent as needed—i.e., when the original message 173 is re-allocated to a different MSC (here, the MSC 122) than the MSC 121 associated with the EPC network selected initial IWS 114. The messages 185-186 would be then sent only once at that time, and the relocation information provided in the A21 Event Notification message at step 185 would mean that subsequent messages from the MME 112 would be sent directly to the IWS 115 only, without requiring any further messaging pair 185-186. It is noted here that MSC pooling does not randomly relocate MSC's on an ongoing basis. That is, pooling only allocates a UE to an MSC on the first time it "sees" that UE (i.e., typically at the time of receiving the initial registration message from the UE). Thereafter, the MSC pool would "remember" the MSC allotment for the UE so that messages now arriving at the newly-assigned IWS 115 would find that they are on the correct MSC 122 that was previously assigned to serve the messages from this specific UE. Hence, there would be no longer any need to "inform" the MME 112 of this correct IWS assignment through another message exchange 185-186.

It is noted here that despite the message exchanges 173, 175 and 185-186 between the MME 112 and respective IWS 114, 115, it may still be desirable to additionally implement the heartbeat mechanism (discussed earlier with reference to FIGS. 7-9) on the respective S102 links 118-119 because the message pair 173, 175 (msg+ack) is for a given UE/caller (i.e., the message pair 173, 175 does not universally detect link failure for all callers) and the message pair 185-186 is only sent as needed (i.e., not repeated until a given link is determined to be "active" or "down") when the original delivery at 173 is re-allocated to a different MSC as mentioned above. If the UE-specific message pair 173, 175 fails, it does not necessarily mean that the corresponding S102 link 118 is down. The failure may be related to standard message loss (quite possible on the prescribed UDP-based links) due to corruption, congestion or message toss in an intermediate node, like a router (not shown). Other callers (with separate message pairs 173, 175) may be getting through on the same link 118. Thus, a separate heartbeat mechanism may allow for higher prioritization and more clarity regarding detection of link failures versus individual UE-specific transaction failures.

FIG. 12 shows another mechanism according to one embodiment of the present disclosure to update an MME (e.g., the MME 112) with information about IWS relocation within an MSC pool (e.g., the MSC pool 116). Discussion of items having the same reference numerals in FIGS. 11-12 is not repeated herein for the sake of brevity. It is noted here that, in the embodiment of FIG. 12, instead of introducing an extra message pair (like the messages 185-186 in FIG. 11 discussed above) between the MME 112 and the re-assigned IWS 115, the acknowledgement for the initially-received message (i.e., the A21-Ack 175 in FIGS. 10-11) is delayed until the pooling algorithm has identified an MSC (here, the MSC 122) to serve the message and has delivered that initial message to that MSC (as indicated by arrow 183). In other words, in the embodiment of FIG. 12, the initially-selected IWS 114 does not send an acknowledgement (i.e., the A21-Ack 175) to the MME 112 (unless the IWS 114 is instructed to deliver the initial message 173 to the MSC 121—i.e., the MSC associated with that IWS 114). Instead, the finally-selected (or, re-assigned) IWS 115 sends the A21-Ack to the MME 112 (as indicated by arrow 192) with the same "CorrelationID" value as that in the initially-forwarded message 173 (as indicated at text box 193). In response to the A21-Ack 192, the MME 112 may update the initially established tunnel (which reflected a mapping from the IMSI of the UE to the IP address of the initially-selected IWS 114 as indicated at text box 171) with a new tunnel (over the S102 link 119) that now reflects the mapping from UE's IMSI to the different source address used in the A21-Ack 192 (i.e., the IP address of the newly-assigned IWS 115), as indicated at text box 194. Thus, through the implicit endpoint update mechanism of FIG. 12 (where IWS relocation is implied through A21-Ack from a different source address), the MME 112 may be updated with information about re-assignment of IWS's within the MSC pool 116 so as to enable the MME 112 to send subsequent call-related messages directly to the newly-assigned IWS 115 (and not to the initially-selected IWS 114), thereby preventing bouncing of messages within the MSC pool 116.

It is observed here that in order to update UE to MSC/IWS mapping in the approach depicted in FIG. 12, the MME node 112 may need to check each A21-Ack (response) message received from an IWS in the MSC pool 116 to see if the IP endpoint address has changed. Furthermore, the mechanism in FIG. 12 may increase the chance that the MME node 112 may re-transmit the initial message 173 (to the initially-selected IWS 114) when A21-Ack is not received from the newly-assigned IWS 115 as a result of initial request message being lost or discarded en-route to this new IWS 115. In one embodiment, existing specifications may be enhanced to facilitate sending of A21-Ack from an S102 endpoint that is different from the endpoint that originally-received the corresponding message for which the A21-Ack is the response.

Figure 13:
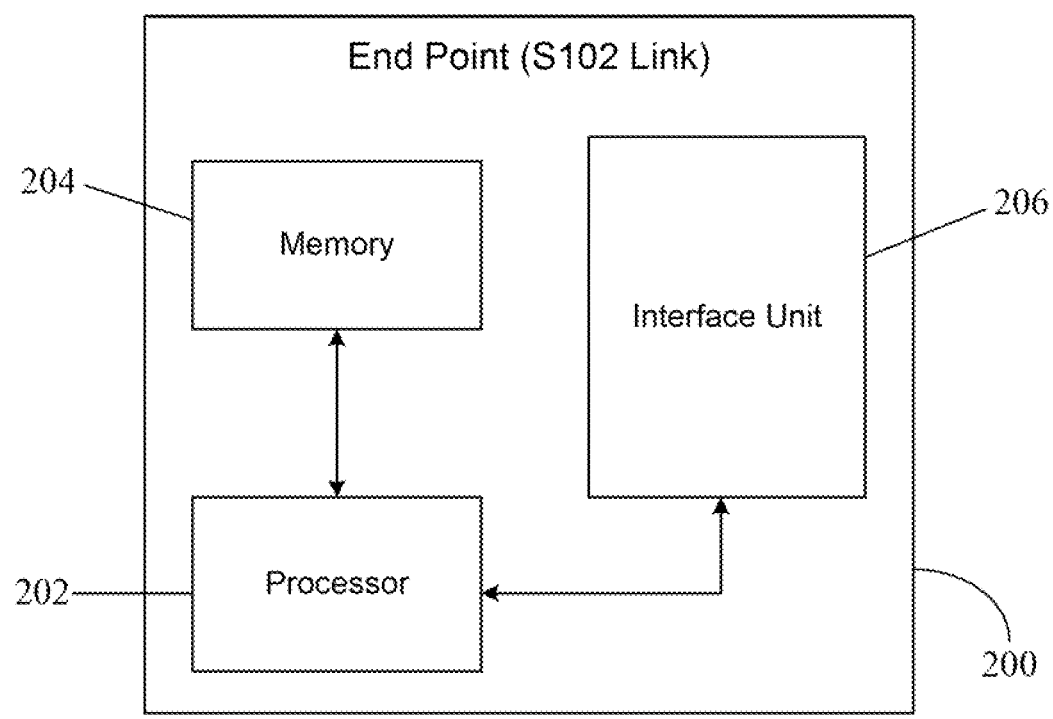
FIG. 13 is a block diagram of an exemplary S102 endpoint according to one embodiment of the present disclosure.

FIG. 13 is a block diagram of an exemplary S102 endpoint 200 according to one embodiment of the present disclosure. Depending on the context of discussion, the S102 endpoint 200 may represent an MME (e.g., any of the MME's 76 or 112), a 1xCS IWS (e.g., any of the IWS's 78, 114, or 115), or any other network entity hosting the MME or IWS function (e.g., a 1xBS). For ease of discussion, only a general/common architectural diagram of such an S102 endpoint is shown in FIG. 13 to represent both an MME as well as an IWS, without identifying specific architectural and functional distinctions of each of these entities. It is understood that in certain embodiments, an MME or IWS may contain additional components beyond those shown in FIG. 13 that may be responsible for enabling one endpoint's communication with the other over an S102 link and for providing certain aspects of the endpoint-specific functionality, including any of the functionality described above with reference to FIGS. 4-12 and/or any functionality necessary to support various solutions as per the teachings of the present disclosure described above.

As shown in FIG. 13, an S102 endpoint 200 may include a processor 202, a memory 204, and an interface unit 206. The processor 202 may be coupled to the memory 204 and the interface unit 206 to enable the endpoint 200 to perform link failure detection and IWS relocation management as per various embodiments of the present disclosure discussed earlier. For example, when the endpoint 200 is an MME, the processor 202 may receive a UE's call, establish an S102 tunnel (through the interface unit 206) to an EPC network-selected IWS to service the call, and create a temporary entry (e.g., in a mapping table in the memory 204) for the mapping between UE's IMSI and IP address of the EPC network-selected IWS. The processor 202 may also perform link failure detection using, for example, the heartbeat mechanism discussed earlier with reference to FIGS. 7-9. On the other hand, when the endpoint 200 is an IWS, the processor 202 may send an A21 Event Notification message (through the interface unit 206) when IWS relocation occurs in the corresponding MSC pool as discussed before with reference to FIG. 11 or an A21-Ack message 192 as discussed before with reference to FIG. 12. In particular, some or all of the functionalities described above in conjunction with the MME 112 and the IWS's 114-115 as per teachings of the present disclosure may be provided by the respective entity-specific processor 202 suitably configured to execute instructions stored on a computer-readable medium (such as the memory 204) to enable the processor 202 to provide various endpoint-specific (MME- or IWS-specific) functionalities discussed herein.

The processor 202 may be in communication with the memory 204 to process and store relevant information (e.g., S102 tunnel mappings, IMSI's of UEs, etc.) for the respective endpoint 200. The processor 202 may also provide additional endpoint-specific functions as required. The processor 202 may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

The interface unit 206 may provide a bi-directional interface for the endpoint 200 to enable it to communicate with the other endpoint of a common S102 link (e.g., the S102 link 25, 118, or 119) to facilitate and support messaging for link failure detection and IWS relocation as per various embodiments of the present disclosure.

Although features and elements are described above in particular combinations, each feature or element can be used alone without the other features and elements or in various combinations with or without other features and elements. Either of the methodologies provided herein (related to link failure detection and IWS re-assignment) may be implemented in a computer program, software, or firmware incorporated in a computer-readable storage medium (e.g., the memory 204 in FIG. 13) for execution by a general purpose computer or a processor (e.g., the processor 202 in FIG. 13). Examples of computer-readable storage media include a Read Only Memory (ROM), a Random Access Memory (RAM), a digital register, a cache memory, semiconductor memory devices, magnetic media such as internal hard disks, magnetic tapes and removable disks, magneto-optical media, and optical media such as CD-ROM disks and Digital Versatile Disks (DVDs).

As mentioned before, an MME and/or IWS may not be a stand-alone entity—i.e., the MME and/or IWS functionalities may be implemented in or hosted in other network entities in the generic architecture 70 of FIG. 4. Furthermore, various MME-IWS messaging discussed earlier with reference to FIGS. 5-12 may be broadly considered to be performed by their respective networks (e.g., the EPC network 72 and the 1xCS network 74 in FIG. 4). In other words, by implementing respective MME or IWS units as per teachings of the present disclosure, the corresponding EPC or 1xCS network may be considered "configured" to perform such messaging.

It is noted here that various heartbeat-related messages (e.g., A21-Parameters Request, A21-Parameters, etc.) discussed earlier with or without reference to heartbeat mechanisms in FIGS. 7-9 are exemplary only. In particular embodiments, other messages (A21 or non-A21 messages) over an S102 interface may be used or devised to implement a heartbeat-type mechanism for link failure detection as per teachings of the present disclosure. Similarly, the A21 Event Notification message shown and discussed with reference to FIG. 11 is exemplary as well. In certain embodiments, other A21 or non-A21 message(s) over an S102 interface may be selected or configured to implement IWS relocation-related messaging discussed earlier with reference to FIGS. 11-12.

The foregoing describes a method and mechanism to detect failure of an S102 link between an EPC-network MME and an IWS in an MSC pool deploying CSFB for the EPC network. A heartbeat message exchange between an MME-IWS pair augments the current standards to provide a simple and direct method to monitor the application layer status of the S102 link between the EPC-based MME and the MSC pool-based IWS. Upon detecting a link failure, message flows can be quickly re-routed to another S102 link or MSC. Reverse use of an A21 Event Notification message from an IWS to MME or a re-assigned IWS's delayed acknowledgement of an initial call-related message from an MME also augment the current standards to address IWS relocation related message-bouncing in MSC pool-based deployments of CSFB, thereby allowing efficient routing of messages.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of detecting failure of a User Datagram Protocol (UDP) based S102 link having a first end point and a second end point, the S102 link connecting an Evolved Packet Core (EPC) based network and a Mobile Switching Center (MSC) pool deploying Circuit Switched Fallback (CSFB) for the EPC-based network, the method comprising the steps of:
the first end point sending at least one first message to the second end point over the S102 link, wherein the first message is one of the following:
an A21-Parameters Request message, or
an A21-Parameters message;
the first end point waiting for a first predetermined time to receive a second message from the second end point over the S102 link, wherein the second message represents acknowledgment of receipt of the first message by the second end point and wherein the second message is an A21-Ack message; and
the first end point detecting that the S102 link has failed upon non-receipt of the second message at the conclusion of the first predetermined wait time.

2. The method of claim 1, wherein the first end point is a Mobility Management Entity (MME) and the second end point is an Interworking System (IWS).

3. The method of claim 1, wherein the first end point is an Interworking System (IWS) and the second end point is a Mobility Management Entity (MME).

4. The method of claim 1, wherein the first and the second messages are based on Stream Control Transmission Protocol (SCTP).

5. The method of claim 1, further comprising:
during the first predetermined time, the first end point repeatedly sending a predetermined number of first messages to the second end point; and
after each transmission of the first message, the first end point waiting for a transmission-specific second predetermined time to receive the second message from the second end point, wherein the total of all second predetermined times is less than or equal to the first predetermined time.

6. The method of claim 1, further comprising:
during the first predetermined time, the first end point repeatedly sending a predetermined number of first messages to the second end point; and
the second end point detecting that the link has failed upon non-receipt of a specific number of consecutive first messages from the first end point.

7. A Mobility Management Entity (MME) in an Evolved Packet Core (EPC) network, wherein the EPC is coupled to a Mobile Switching Center (MSC) pool deploying Circuit Switched Fallback (CSFB) for the EPC network, wherein a User Datagram Protocol (UDP) based S102 link connects the MME in the EPC network with an Interworking System (IWS) in the MSC pool, wherein the MME and the IWS form end points of the S102 link, and wherein the MME includes a processor coupled to a memory that includes computer program instructions, when the processor executes the computer program instructions the processor causes the MME to perform the following:
send at least one first message from the MME to the IWS over the S102 link, wherein the first message is one of the following:
an A21-Parameters Request message, or
an A21-Parameters message;
wait for a first predetermined time to receive a second message from the IWS to the MME over the S102 link, wherein the second message represents acknowledgment of receipt of the first message by the IWS and wherein the second message is an A21-Ack message; and
detect that the S102 link has failed when the MME fails to receive the second message from the IWS at the conclusion of the first predetermined wait time.

8. An Interworking System (IWS) in a Mobile Switching Center (MSC) pool, wherein the MSC pool is coupled to an Evolved Packet Core (EPC) network and deploys Circuit Switched Fallback (CSFB) for the EPC network, wherein a User Datagram Protocol (UDP) based S102 link connects the IWS in the MSC pool with a Mobility Management Entity (MME) in the EPC network, wherein the IWS and the MME form end points of the S102 link, and wherein the IWS includes a processor coupled to a memory that includes computer program instructions, when the processor executes the computer program instructions the processor causes the IWS to perform the following:
send at least one first message from the IWS to the MME over the S102 link, wherein the first message is one of the following:
an A21-Parameters Request message, or
an A21-Parameters message;
wait for a first predetermined time to receive a second message from the MME to the IWS over the S102 link, wherein the second message represents acknowledgment of receipt of the first message by the MME and wherein the second message is an A21-Ack message; and
detect that the S102 link has failed when the IWS fails to receive the second message from the MME at the conclusion of the first predetermined wait time.

9. A method of updating a Mobility Management Entity (MME) in an Evolved Packet Core (EPC) network with information about re-assignment of Interworking Systems (IWS's) within a Mobile Switching Center (MSC) pool that deploys Circuit Switched Fallback (CSFB) for the EPC network, wherein the method comprises the steps of:
the MME receiving an initial message as part of a call from a mobile communication unit operating in the EPC network;
the MME establishing a first tunnel to a first IWS in the MSC pool selected by the EPC network to service the initial message received from the mobile communication unit, wherein the first tunnel maps an identification of the mobile communication unit to an identification of the first IWS;
the MME forwarding the initial message to the first IWS using the first tunnel;
the MME receiving a notification message from a second IWS in the MSC pool, wherein the second IWS is assigned by the MSC pool to service the call from the mobile communication unit instead of the EPC network-selected first IWS; and
in response to receiving the notification message, the MME updating the first tunnel with a second tunnel to the second IWS, wherein the second tunnel replaces the mapping in the first tunnel with a mapping from the identification of the mobile communication unit to an identification of the second IWS.

10. The method of claim 9, wherein each of the first tunnel and the second tunnel is a respective User Datagram Protocol (UDP) based S102 tunnel.

11. The method of claim 9, wherein the notification message is an A21 Event Notification message that contains the identification of the second IWS.

12. The method of claim 9, wherein the notification message is an A21-Ack message corresponding to the initial message sent from the MME to the first IWS and has the identification of the second IWS as a source address thereof.

13. The method of claim 9, wherein the identification of the mobile communication unit is an International Mobile Subscriber Identity (IMSI) of the mobile communication unit, wherein the identification of the first IWS is an Internet Protocol (IP) address of the first IWS, and wherein the identification of the second IWS is an IP address of the second IWS.

14. The method of claim 9, further comprising:
in response to the forwarding, the MME receiving a first acknowledgment from the first IWS via the first tunnel.

15. The method of claim 9, further comprising the step of:
upon updating the first tunnel, the MME sending all subsequent call-related messages from the mobile communication unit to the second IWS only via the second tunnel and without involving the first IWS.

16. An Interworking System (IWS) unit coupled to an Evolved Packet Core (EPC) network, wherein the IWS unit includes a first IWS and a second IWS, and wherein the IWS unit is configured to perform the following:
receive an initial message at the first IWS from a Mobility Management Entity (MME) in the EPC network, wherein the initial message is received at the first IWS via a first tunnel and is part of a call received at the MME from a mobile communication unit operating in the EPC network;
use a second IWS instead of the first IWS to service the call from the mobile communication unit; and
send a notification message from the second IWS to the MME using a second tunnel that is different from the first tunnel, wherein the notification message contains an Internet Protocol (IP) address of the second IWS, thereby allowing the MME to send all subsequent call-related messages from the mobile communication unit to the second IWS only via the second tunnel and without involving the first IWS.

17. The IWS unit of claim 16, wherein the IWS unit is further configured to perform the following:
send a first acknowledgment from the first IWS to the MME using the first tunnel; and
in response to the notification message, receive a second acknowledgement at the second IWS from the MME via the second tunnel.

18. The IWS unit of claim 17, wherein each of the first acknowledgement and the second acknowledgement is a respective A21-Ack message.

19. The IWS unit of claim 17, wherein each of the first tunnel and the second tunnel is a respective User Datagram Protocol (UDP) based S102 tunnel.

20. The IWS unit of claim 17, wherein the notification message is one of the following:
an A21 Event Notification message; and
an A21-Ack message corresponding to the initial message received by the first IWS from the MME.

21. A method of updating a Mobility Management Entity (MME) in an Evolved Packet Core (EPC) network with information about re-assignment of Interworking Systems (IWS's) within a Mobile Switching Center (MSC) pool that deploys Circuit Switched Fallback (CSFB) for the EPC network, wherein the method comprises the steps of:
the MME receiving a call from a mobile communication unit operating in the EPC network;
the MME establishing a first tunnel to a first IWS in the MSC pool selected by the EPC network to service an initial message received from the mobile communication unit as part of the call therefrom, wherein the first tunnel maps a first identification of the mobile communication unit to a second identification of the first IWS;
the MME forwarding the initial message to the first IWS using the first tunnel;
the MME receiving an acknowledgement message corresponding to the MME-sent initial message;
the MME checking a source address of the acknowledgement message to determine whether the acknowledgement message is from the first IWS or a second IWS in the MSC pool that is different from the first IWS, wherein the second IWS is assigned by the MSC pool to service the call from the mobile communication unit instead of the EPC network-selected first IWS, and wherein the acknowledgement message contains the second identification of the first IWS as the source address thereof when the first IWS services the call or a third identification of the second IWS as the source address thereof when the second IWS is assigned to service the call; and
upon determining that the acknowledgement message is from the second IWS, the MME updating the first tunnel with a second tunnel to the second IWS, wherein the second tunnel replaces the mapping in the first tunnel with a mapping from the first identification of the mobile communication unit to the third identification of the second IWS.

22. The method of claim 21, wherein each of the first tunnel and the second tunnel is a respective User Datagram Protocol (UDP) based S102 tunnel.

23. The method of claim 22, wherein the acknowledgement message is an A21-Ack message.

24. The method of claim 21, wherein the first identification is an International Mobile Subscriber Identity (IMSI) of the mobile communication unit, wherein the second identification is a first Internet Protocol (IP) address of the first IWS, and wherein the third identification is a second IP address of the second IWS.

25. The method of claim 21, further comprising the step of:
upon updating the first tunnel, the MME sending all subsequent call-related messages from the mobile communication unit to the second IWS only via the second tunnel and without involving the first IWS.

* * * * *